United States Patent
Li

(10) Patent No.: US 10,552,348 B2
(45) Date of Patent: Feb. 4, 2020

(54) USB DEVICE ACCESS METHOD, APPARATUS AND SYSTEM, A TERMINAL, AND A SERVER

(71) Applicant: Huawei Technologies Co., Ltd., Shenzhen (CN)

(72) Inventor: Mingdeng Li, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/940,384

(22) Filed: Mar. 29, 2018

(65) Prior Publication Data
US 2018/0217948 A1  Aug. 2, 2018

Related U.S. Application Data

(63) Continuation of application No. PCT/CN2016/081261, filed on May 6, 2016.

(30) Foreign Application Priority Data

Sep. 30, 2015 (CN) .......................... 2015 1 0642731

(51) Int. Cl.
  *G06F 13/10* (2006.01)
  *G06F 9/455* (2018.01)
  *G06F 13/42* (2006.01)

(52) U.S. Cl.
  CPC ........ *G06F 13/102* (2013.01); *G06F 9/45558* (2013.01); *G06F 13/4282* (2013.01);
  (Continued)

(58) Field of Classification Search
  CPC ............... G06F 13/102; G06F 13/4282; G06F 9/45558; G06F 2009/45579; G06F 2213/0042
  See application file for complete search history.

(56) References Cited

U.S. PATENT DOCUMENTS

2009/0150909 A1* 6/2009 Barreto ................. G06F 9/4411
                                                         719/324
2012/0084381 A1   4/2012 Alladi et al.
(Continued)

FOREIGN PATENT DOCUMENTS

CN       101035039 A     9/2007
CN       102270186 A    12/2011
(Continued)

OTHER PUBLICATIONS

Foreign Communication From a Counterpart Application, European Application No. 16850079.1, Extended European Search Report dated Sep. 26, 2018, 7 pages.
(Continued)

*Primary Examiner* — Henry Tsai
*Assistant Examiner* — John B Roche
(74) *Attorney, Agent, or Firm* — Conley Rose, P.C.

(57) ABSTRACT

A universal serial bus (USB) device access method, apparatus and system, a terminal, and a server are provided. The method, executed by a terminal, includes receiving an access request delivered by a server; if the access request instructs the terminal to perform the first access operation on the physical USB device, performing a first processing operation corresponding to the first access operation according to a compatibility policy, so as to feedback an execution result of the first processing operation to the server. The terminal performs the first processing operation by responding to the first access operation when the physical USB device does not support the first access operation therefore ensuring that a user properly uses the physical USB device.

24 Claims, 14 Drawing Sheets

(52) U.S. Cl.
CPC .............. *G06F 2009/45579* (2013.01); *G06F 2213/0042* (2013.01)

(56) References Cited

U.S. PATENT DOCUMENTS

| | | | | |
|---|---|---|---|---|
| 2012/0191879 A1* | 7/2012 | MacInnis | ............ | G06F 16/9577 710/8 |
| 2012/0221622 A1* | 8/2012 | Raju | ........................ | H04L 67/08 709/202 |
| 2013/0254437 A1* | 9/2013 | Brown | ................... | G06Q 10/00 710/36 |

FOREIGN PATENT DOCUMENTS

| | | | |
|---|---|---|---|
| CN | 102368231 | A | 3/2012 |
| CN | 102411688 | A | 4/2012 |
| CN | 102419737 | A | 4/2012 |
| CN | 102567074 | A | 7/2012 |
| CN | 103714020 | A | 4/2014 |
| CN | 104484291 | A | 4/2015 |
| CN | 104881315 | A | 9/2015 |
| CN | 105183675 | A | 12/2015 |
| EP | 1043876 | A2 | 10/2000 |
| EP | 2071460 | A2 | 6/2009 |
| EP | 2230597 | A1 | 9/2010 |

OTHER PUBLICATIONS

Machine Translation and Abstract of Chinese Publication No. CN101035039, Sep. 12, 2007, 17 pages.
Machine Translation and Abstract of Chinese Publication No. CN102270186, Dec. 7, 2011, 16 pages.
Machine Translation and Abstract of Chinese Publication No. CN102368231, Mar. 7, 2012, 12 pages.
Machine Translation and Abstract of Chinese Publication No. CN102411688, Apr. 11, 2012, 11 pages.
Machine Translation and Abstract of Chinese Publication No. CN102419737, Apr. 18, 2012, 12 pages.
Machine Translation and Abstract of Chinese Publication No. CN102567074, Jul. 11, 2012, 6 pages.
Machine Translation and Abstract of Chinese Publication No. CN103714020, Apr. 9, 2014, 10 pages.
Machine Translation and Abstract of Chinese Publication No. CN104484291, Apr. 1, 2015, 34 pages.
Machine Translation and Abstract of Chinese Publication No. CN104881315, Sep. 2, 2015, 10 pages.
Machine Translation and Abstract of Chinese Publication No. CN105183675, Dec. 23, 2015, 54 pages.
Wang, X., et al., "Research on USB Device Redirected under Linux," Journal of Wuhan Polytechnic University, vol. 27, No. 4, Dec. 2008, 3 pages.
Sun, Y., et al., "Research on USB Device Redirection Technology in Cloud Desktop", Netinfo Security, Apr. 2015, pp. 78-85.
Foreign Communication From a Counterpart Application, Chinese Application No. 201510642731.0, Chinese Office Action dated Sep. 1, 2017, 5 pages.
Foreign Communication From a Counterpart Application, PCT Application No. PCT/CN2016/081261, English Translation of International Search Report dated Aug. 10, 2016, 3 pages.

\* cited by examiner

USB DEVICE ACCESS METHOD, APPARATUS AND SYSTEM, A TERMINAL, AND A SERVER

CROSS-REFERENCE TO RELATED APPLICATION

This application is a continuation of International Application No. PCT/CN2016/081261, filed on May 6, 2016, which claims priority to Chinese Patent Application No. 201510642731.0, filed on Sep. 30, 2015, both of which are hereby incorporated by reference in their entireties.

TECHNICAL FIELD

The present application relates to the field of computer technologies, and in particular, to a USB device access method and apparatus, a terminal, a server, and a system.

BACKGROUND

A remote virtual user interface provided by a remote virtual desktop system running on a server side is delivered using the Remote Desktop Protocol to various local terminals for use by a user on a terminal side. In addition, using the Remote Desktop Protocol, various physical peripherals connected to the terminal side can be mapped to the remote virtual desktop system on the server side, and virtual peripherals of the peripherals can be displayed on a remote virtual desktop provided for the terminal side, so that a user can implement an operation on a physical peripheral by performing an operation on the virtual device on the terminal side. The Remote Desktop Protocol involves interaction between the terminal side and the server side. The protocol is internally divided into different interactive services according to different functions for implementation. For a universal serial bus (USB) service, a physical USB device connected to the terminal side is also mapped to the remote virtual desktop by means of interaction between the terminal side and the server side, and a corresponding virtual USB device is obtained by means of mapping on the remote virtual desktop for user operation.

FIG. 1 is a USB redirection framework provided by the common Remote Desktop Protocol, where the USB redirection framework is divided into a terminal side and a server side. A framework body includes four parts: a USB universal driver, a USB client, a USB server, and a USB virtual bus driver. Referring to FIG. 1, the USB universal driver and the USB client are located on the terminal side of the redirection framework, and the USB server and the USB virtual bus driver are located on the server side of the redirection framework. The USB universal driver works in a kernel mode on the terminal side, and is loaded and initialized by an operating system (OS), so as to obtain device information of an inserted USB device, so that the USB client reads the device information from the USB universal driver. A virtual channel is established between the USB client and the USB server, and the USB server interacts with the USB client. The USB virtual bus driver works in a kernel mode on the server side, and is loaded and initialized by a virtual desktop system, and provides a capability of dynamically creating or deleting a virtual USB device to the USB server.

Based on the USB redirection framework provided in FIG. 1, when a physical USB device is inserted into the terminal side, the USB universal driver detects an insertion event of the physical USB device. Then, the USB client reads device information of the USB device from the USB universal driver, and uploads the read device information to the USB server. The USB server serves as a process or a thread that provides a USB service (which is a system service) in the remote virtual desktop system. After receiving the device information, the USB server determines, according to a redirection mapping policy, whether to support mapping of the USB device to the remote virtual desktop. If mapping of the USB device to the remote virtual desktop is supported, the USB server delivers a USB device redirection enabling notification to the USB client on the terminal side so that the USB client forwards the redirection enabling notification to the USB universal driver. The USB universal driver enables redirection of a USB message according to the redirection enabling notification, and feeds back an enabling result to the USB server using the USB client. The server learns, according to the enabling result, that the USB device successfully enables the redirection function, and then creates a virtual device of the USB device (namely, the virtual USB device in FIG. 1) using the USB virtual bus driver.

After the inserted physical USB device is successfully mapped into the virtual USB device in the remote virtual desktop system, if the USB virtual bus driver obtains an I/O request operation or another access control operation of a user for the virtual USB device, the USB virtual bus driver encapsulates the access control operation into operation request information, so that the USB server reads the operation request message. The USB server delivers the operation request message to the USB client, so that the USB client forwards the operation request message to the USB universal driver. The USB universal driver forwards the operation request message to the inserted physical USB device for processing. The following problems may exist in a process of implementing the prior art.

Because the USB universal driver on the terminal side is basically redirected completely according to a standard USB protocol specification, if the physical USB device is not designed according to the standard USB protocol specification, the physical USB device cannot perform correct redirection according to the operation request message, or even cannot implement redirection according to the operation request message, affecting normal use of the physical USB device by a user.

SUMMARY

To resolve a problem in the prior art, this application provides a USB device access method and apparatus, a terminal, a server, and a system. The technical solutions are as follows.

According to one aspect, a USB device access method is provided, where a system to which the method is applied includes a terminal and a server, the server runs a virtual desktop system, and when the terminal accesses a physical USB device, maps the physical USB device into a virtual USB device using the virtual desktop system, and the method includes receiving an access request delivered by the server, where the access request is triggered by the server when detecting an operation performed on the virtual USB device; determining whether an access operation indicated by the access request is a first access operation; and if the access request instructs the terminal to perform the first access operation on the physical USB device, performing a first processing operation corresponding to the first access operation according to a compatibility policy, so as to feed back an execution result of the first processing operation to the server, where the compatibility policy records a correspondence between the first access operation expected to be performed by the server on the physical USB device and the first processing operation performed by the terminal in response to the first access operation, and the first processing operation is an action performed by the terminal in response to the first access operation when the physical USB device does not support the first access operation.

In a possible design, if the physical USB device supports implementation of a second access operation that has a same function as the first access operation and that is different from the first access operation, the first processing operation includes a second access operation performed by the terminal on the physical USB device, and obtaining an execution result of the second access operation performed on the physical USB device; and if the physical USB device does not support implementation of another access operation that has a same function as the first access operation and that is different from the first access operation, the first processing operation includes the terminal directly obtains a response result of the first access operation.

In a possible design, the compatibility policy is obtained by the server by matching according to device information of the physical USB device, and is delivered to the terminal.

In a possible design, if the physical USB device supports implementation of another access operation that has a function different from a function of the first access operation, performing, on the physical USB device, another access operation indicated by the access request, and obtaining an execution result of the another access operation performed on the physical USB device, so as to feed back the execution result of the another access operation to the server.

In a possible design, a first processing policy is obtained and delivered to the terminal by the server according to the device information of the physical USB device when learning that the terminal accesses the physical USB device, where the first processing policy instructs the terminal to periodically read data from the physical USB device and cache the read data; and the method further includes executing, by the terminal, the first processing policy, so that when responding to a request of the server for expecting to read data from the physical USB device, the terminal directly feeds back cached data to the server.

In a possible design, a second processing policy is obtained and delivered to the terminal by the server according to the device information of the physical USB device when learning that the terminal accesses the physical USB device, and the method further includes executing, by the terminal, the second processing policy, where the second processing policy instructs the terminal to compress data obtained by accessing the physical USB device, so as to feed back the compressed data to the server.

In a possible design, the server provides a remote virtual desktop for user operation on the terminal using the virtual desktop system, and provides an access interface of the virtual USB device on the remote virtual desktop, so that a user operates the access interface to trigger the server to generate the access request.

According to one aspect, a USB device access method is provided, where a system to which the method is applied includes a terminal and a server, the server runs a virtual desktop system, and the method includes, after a physical USB device accessed by the terminal is mapped into a virtual USB device using the virtual desktop system, detecting whether an operation performed on the virtual USB device exists; if the operation on the virtual USB device is detected, delivering an access request to the terminal, where after the terminal determines that the access request instructs to perform a first access operation on the physical USB device, the terminal performs a first processing operation corresponding to the first access operation according to a compatibility policy delivered by the server; and receiving an execution result of the first processing operation fed back by the terminal, where the compatibility policy records a correspondence between the first access operation expected to be performed by the server on the physical USB device and the first processing operation performed by the terminal in response to the first access operation, and the first processing operation is an action performed by the terminal in response to the first access operation when the physical USB device does not support the first access operation.

In a possible design, the method further includes obtaining a compatibility policy that matches device information of the physical USB device; and delivering the compatibility policy to the terminal.

In a possible design, before the obtaining a compatibility policy that matches device information of the physical USB device, the method further includes obtaining the first access operation that is not supported by the physical USB device, the first processing operation that is set for the first access operation, and the device information of the physical USB device; and recording a correspondence among the first access operation, the first processing operation, and the device information of the physical USB device into the compatibility policy.

In a possible design, the method further includes setting a first processing policy for the physical USB device, where the first processing policy is used to instruct the terminal to periodically read data from the physical USB device and cache the read data; storing a correspondence between the first processing policy and device information of the physical USB device; when it is learned that the terminal accesses the physical USB device, obtaining and delivering the first processing policy to the terminal according to the device information of the physical USB device, so that the terminal executes the first processing policy; and receiving cached data that is fed back by the terminal when the terminal responds to a request of the server for expecting to read data from the physical USB device.

In a possible design, the method further includes setting a second processing policy for the physical USB device, where the second processing policy is used to instruct the terminal to compress data obtained by accessing the physical USB device; storing a correspondence between the second processing policy and device information of the physical USB device; when it is learned that the terminal accesses the physical USB device, obtaining and delivering the second processing policy to the terminal according to the device information of the physical USB device, so that the terminal executes the second processing policy; and receiving the compressed data fed back by the terminal.

According to one aspect, a USB device access apparatus is provided, where a system to which the apparatus is applied includes a terminal and a server, the server runs a virtual desktop system, and when the terminal accesses a physical USB device, maps the physical USB device into a virtual USB device using the virtual desktop system, and the apparatus includes a receiving module configured to receive an access request delivered by the server, where the access request is triggered by the server when detecting an operation performed on the virtual USB device; a determining module configured to determine whether an access operation indicated by the access request is a first access operation; and a processing module configured to, if the access request instructs the terminal to perform the first access operation on the physical USB device, perform a first processing operation corresponding to the first access operation according to a compatibility policy, so as to feed back an execution result of the first processing operation to the server, where the compatibility policy records a correspondence between the first access operation expected to be performed by the server on the physical USB device and the first processing operation performed by the terminal in response to the first access operation, and the first processing operation is an action performed by the terminal in response to the first access operation when the physical USB device does not support the first access operation.

In a possible design, the processing module is configured to, if the physical USB device supports implementation of a second access operation that has a same function as the first access operation and that is different from the first access operation, the first processing operation includes a second access operation performed by the terminal on the physical USB device, and obtaining an execution result of the second access operation performed on the physical USB device; and if the physical USB device does not support implementation of another access operation that has a same function as the first access operation and that is different from the first access operation, the first processing operation includes the terminal directly obtains a response result of the first access operation.

In a possible design, the compatibility policy is obtained by the server by matching according to device information of the physical USB device, and is delivered to the terminal.

In a possible design, the processing module is further configured to, if the physical USB device supports implementation of another access operation that has a function different from a function of the first access operation, perform, on the physical USB device, another access operation indicated by the access request, and obtain an execution result of the another access operation performed on the physical USB device, so as to feed back the execution result of the another access operation to the server.

In a possible design, a first processing policy is obtained and delivered to the terminal by the server according to the device information of the physical USB device when learning that the terminal accesses the physical USB device, where the first processing policy instructs the terminal to periodically read data from the physical USB device and cache the read data; and the processing module is further configured to execute, by the terminal, the first processing policy, so that when responding to a request of the server for expecting to read data from the physical USB device, the terminal directly feeds back cached data to the server.

In a possible design, a second processing policy is obtained and delivered to the terminal by the server according to the device information of the physical USB device when learning that the terminal accesses the physical USB device, and the processing module is further configured to execute, by the terminal, the second processing policy, where the second processing policy instructs the terminal to compress data obtained by accessing the physical USB device, so as to feed back the compressed data to the server.

In a possible design, the server provides a remote virtual desktop for user operation on the terminal using the virtual desktop system, and provides an access interface of the virtual USB device on the remote virtual desktop, so that a user operates the access interface to trigger the server to generate the access request.

According to one aspect, a USB device access apparatus is provided, where a system to which the apparatus is applied includes a terminal and a server, the server runs a virtual desktop system, and the apparatus includes a detection module configured to, after a physical USB device accessed by the terminal is mapped into a virtual USB device using the virtual desktop system, detect whether an operation performed on the virtual USB device exists; a sending module configured to, if the operation performed on the virtual USB device is detected, deliver an access request to the terminal, where after the terminal determines that the access request instructs to perform a first access operation on the physical USB device, the terminal performs a first processing operation corresponding to the first access operation according to a compatibility policy delivered by the server; and a receiving module configured to receive an execution result of the first processing operation fed back by the terminal, where the compatibility policy records a correspondence between the first access operation expected to be performed by the server on the physical USB device and the first processing operation performed by the terminal in response to the first access operation, and the first processing operation is an action performed by the terminal in response to the first access operation when the physical USB device does not support the first access operation.

In a possible design, the apparatus further includes an obtaining module configured to obtain a compatibility policy that matches device information of the physical USB device; and the sending module is further configured to deliver the compatibility policy to the terminal.

In a possible design, the apparatus further includes the obtaining module is configured to obtain the first access operation that is not supported by the physical USB device, the first processing operation that is set for the first access operation, and the device information of the physical USB device; and a storage module configured to record a correspondence among the first access operation, the first processing operation, and the device information of the physical USB device into the compatibility policy.

In a possible design, the apparatus further includes a setting module configured to set a first processing policy for the physical USB device, where the first processing policy is used to instruct the terminal to periodically read data from the physical USB device and cache the read data; the storage module is further configured to store a correspondence between the first processing policy and device information of the physical USB device; the sending module is further configured to, when it is learned that the terminal accesses the physical USB device, obtain and deliver the first processing policy to the terminal according to the device information of the physical USB device, so that the terminal executes the first processing policy; and the receiving module is further configured to receive cached data that is fed back by the terminal when the terminal responds to a request of the server for expecting to read data from the physical USB device.

In a possible design, the setting module is further configured to set a second processing policy for the physical USB device, where the second processing policy is used to instruct the terminal to compress data obtained by accessing the physical USB device; the storage module is further configured to store a correspondence between the second processing policy and device information of the physical USB device; the sending module is further configured to, when it is learned that the terminal accesses the physical USB device, obtain and deliver the second processing policy to the terminal according to the device information of the physical USB device, so that the terminal executes the second processing policy; and the receiving module is further configured to receive the compressed data fed back by the terminal.

According to one aspect, a terminal is provided, including a USB client, where the USB client is configured to receive an access request delivered by a server, where the access request is triggered by the server when detecting an operation performed on the virtual USB device; determine whether an access operation indicated by the access request is a first access operation; and if the access request instructs the terminal to perform the first access operation on the physical USB device, perform a first processing operation corresponding to the first access operation according to a compatibility policy, so as to feed back an execution result of the first processing operation to the server, where the compatibility policy records a correspondence between the first access operation expected to be performed by the server on the physical USB device and the first processing operation performed by the terminal in response to the first access operation, and the first processing operation is an action performed by the terminal in response to the first access operation when the physical USB device does not support the first access operation.

According to one aspect, a server is provided, including a USB server and a USB virtual bus driver, where the USB virtual bus driver is configured to, after a physical USB device accessed by a terminal is mapped into a virtual USB device using the virtual desktop system, detect whether an operation performed on the virtual USB device exists; after the USB virtual bus driver detects the operation on the virtual USB device, the USB server is configured to read and deliver an access request to the terminal, where after the terminal determines that the access request instructs to perform a first access operation on the physical USB device, the terminal performs a first processing operation corresponding to the first access operation according to a compatibility policy delivered by the server; and the USB server is configured to receive an execution result of the first processing operation fed back by the terminal, where the compatibility policy records a correspondence between the first access operation expected to be performed by the server on the physical USB device and the first processing operation performed by the terminal in response to the first access operation, and the first processing operation is an action performed by the terminal in response to the first access operation when the physical USB device does not support the first access operation.

According to one aspect, a USB device access system is provided, where the system includes a terminal and a server, and the server runs a virtual desktop system, and when the terminal accesses a physical USB device, maps the physical USB device into a virtual USB device using the virtual desktop system; the terminal is the terminal according to a claim; and the server is the server according to a claim.

The technical solutions provided in this application have the following beneficial effects.

After the server creates the virtual USB device corresponding to the physical USB device accessed by the terminal, if the terminal receives the access request sent by the server for the virtual USB device, the terminal performs the first processing operation corresponding to the first access operation according to the stored compatibility policy after determining that the access operation indicated by the access request is the first access operation. Because the action performed by the terminal in response to the first access operation when the physical USB device does not support the first access operation is set in the compatibility policy, even if the physical USB device is not designed according to the standard USB protocol specification, the physical USB device can still perform correct redirection according to the access request, improving a compatibility capability of USB redirection, and resolving a problem that some physical USB devices that are not designed according to a standard USB protocol specification cannot be redirected, so as to ensure that a user properly uses a physical USB device.

BRIEF DESCRIPTION OF DRAWINGS

To describe the technical solutions in the embodiments of the present application more clearly, the following briefly describes the accompanying drawings required for describing the embodiments. The accompanying drawings described in the following are merely some embodiments of the present application. For a person of ordinary skill in the art, other accompanying drawings may be obtained according to the accompanying drawings without creative efforts.

DESCRIPTION OF EMBODIMENTS

To make the objectives, technical solutions, and advantages of the present application clearer, the following further describes the implementations of the present application in detail with reference to the accompanying drawings.

Before the embodiments of the present application are further explained, background knowledge related to the embodiments of the present application is first described.

A remote virtual desktop means that computing and storage resources are centralized in a remote server (generally a data center). A user interface of the remote virtual desktop is delivered to various local terminals (such as a thin client, a desktop computer, a laptop computer, a tablet computer, and a smartphone) using a remote desktop protocol for display. In addition, various input/output (I/O) devices (such as a keyboard, a mouse, a USB peripheral, a serial/parallel port peripheral, a headset, and a microphone) of the local terminals can be mapped to a remote server.

Figure 1:
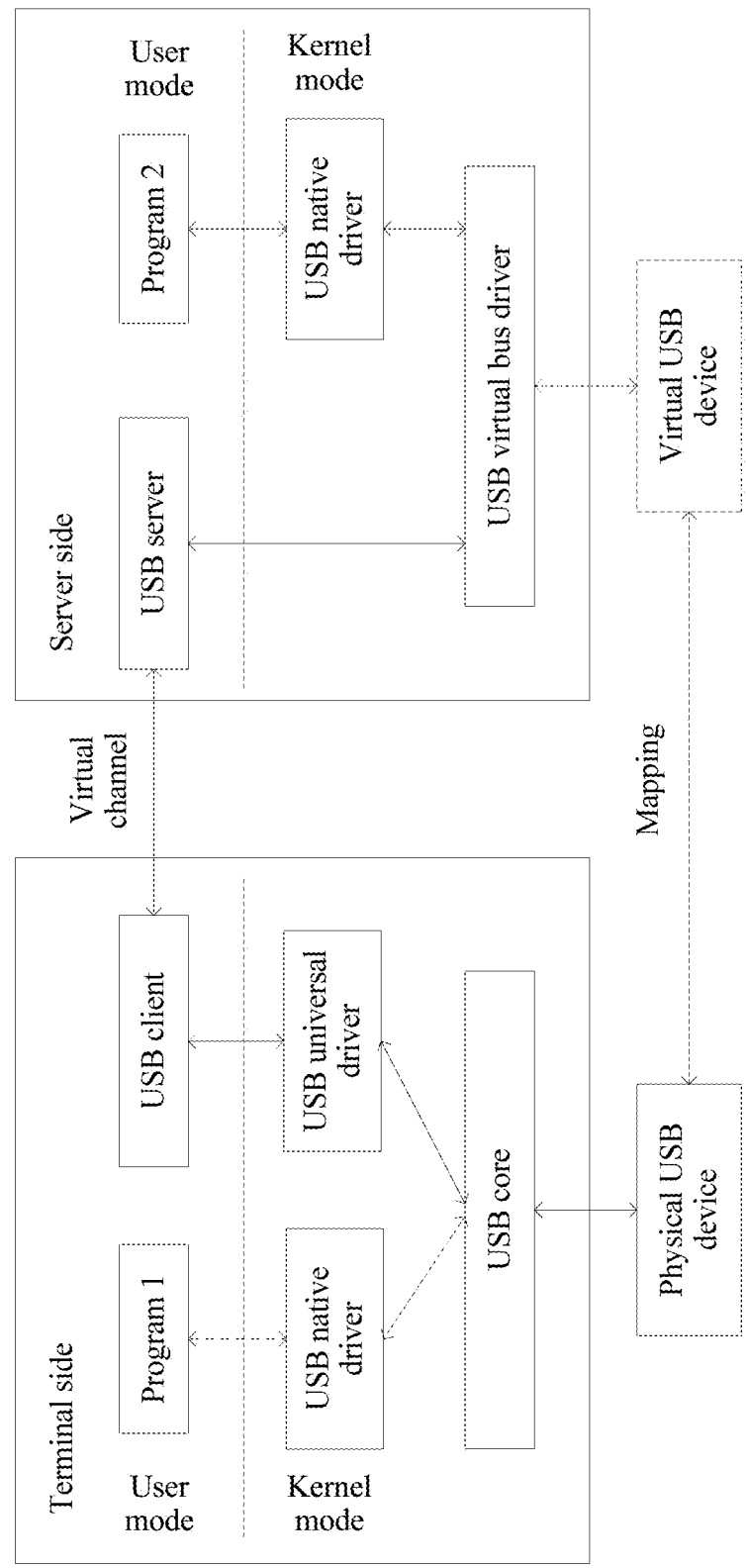
FIG. 1 is a schematic diagram of a USB redirection framework provided by the common Remote Desktop Protocol.
Figure 2:
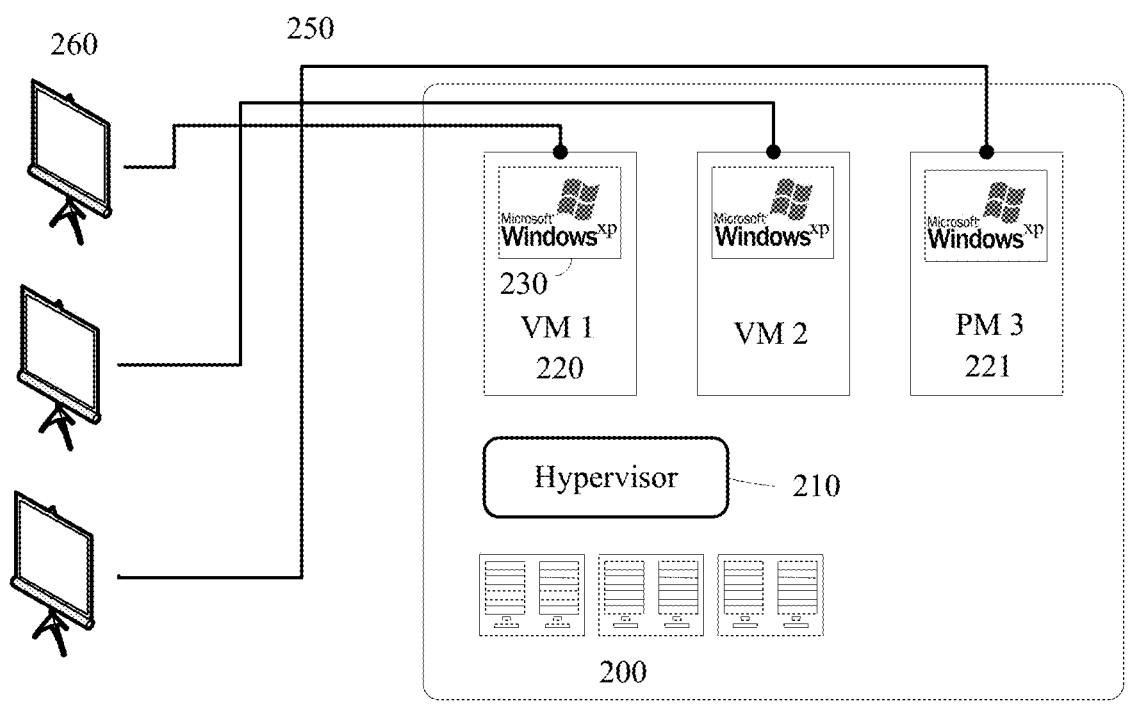
FIG. 2 is a schematic diagram of a remote virtual desktop system.

A common remote virtual desktop system is shown in FIG. 2. A remote data center centralizes a server resource and a storage resource (200); virtualizes multiple virtual computers (220) using a virtualization technology (210) or directly uses a physical computer (221) without requiring a virtualization technology, where an OS (230) is installed on these virtual computers or the physical computer; delivers a user interface of a remote virtual desktop to a local terminal (260) using a remote desktop protocol (250) for display; and maps an I/O device on the local terminal to a server of the remote virtual desktop.

Figure 3A:
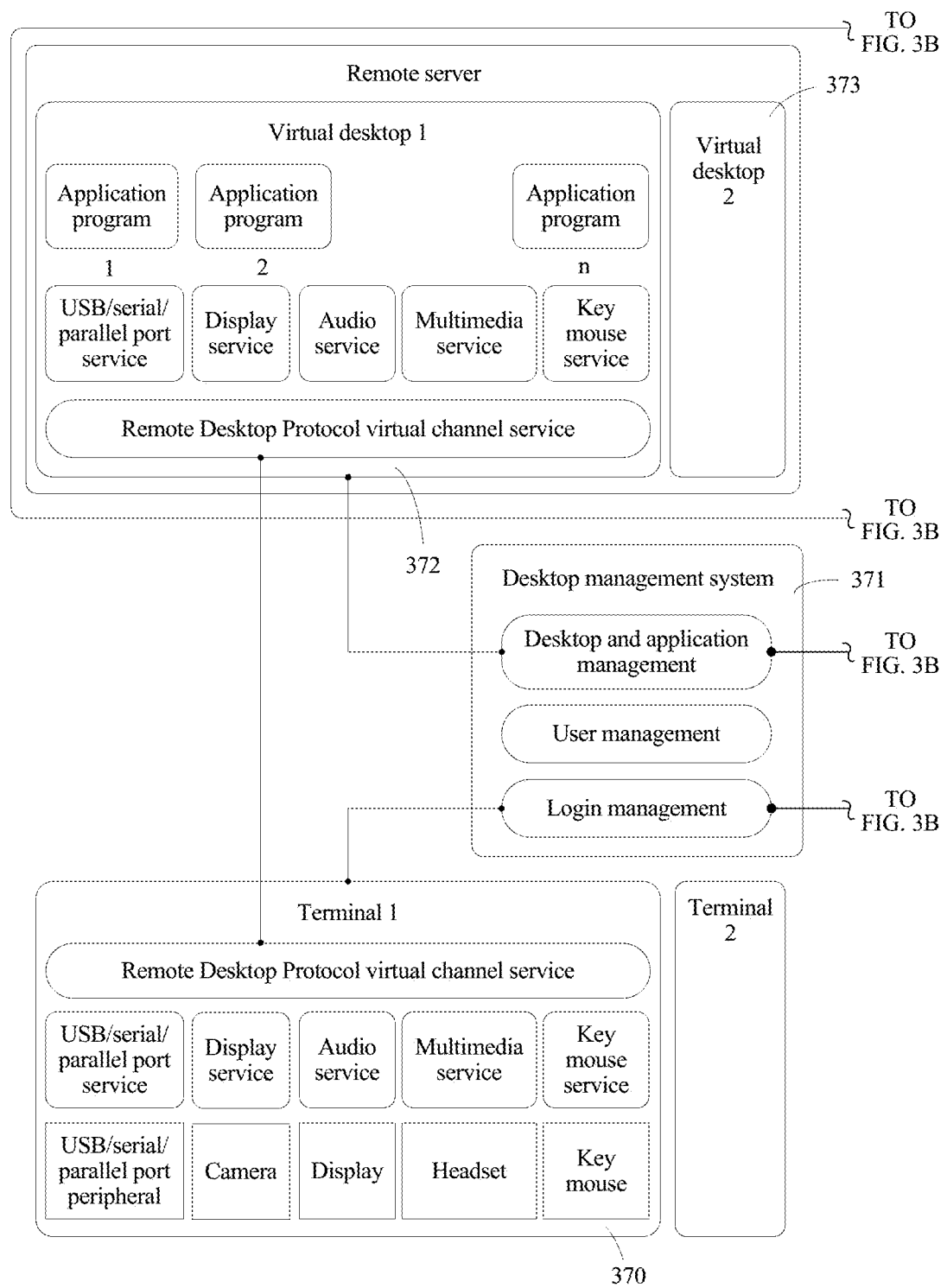
FIG. 3A and FIG. 3B are an architectural diagram of a remote virtual desktop system.
Figure 3B:
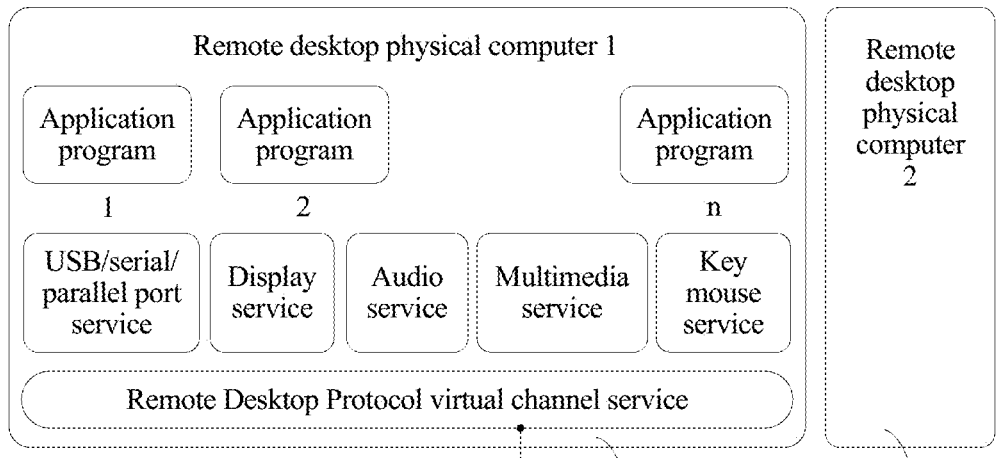
Figure 3B:
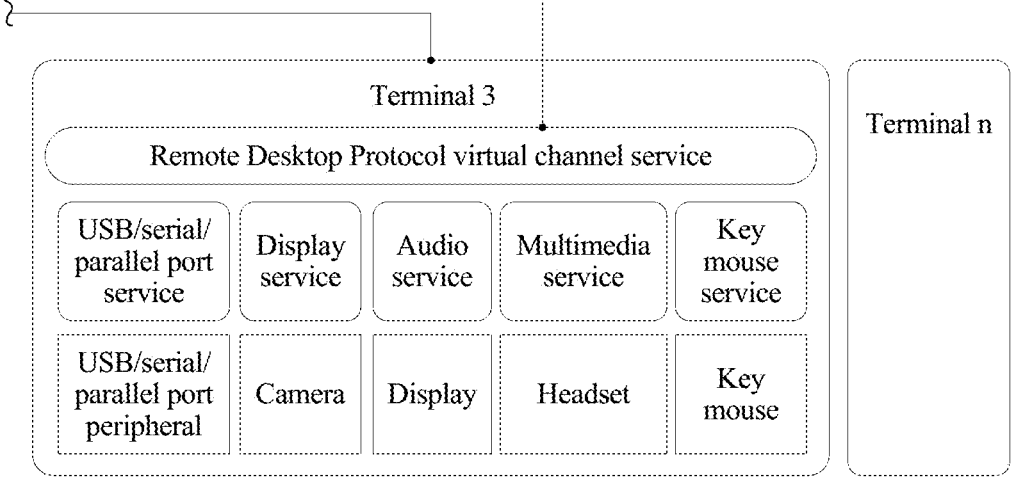

An architecture of the remote virtual desktop system is shown in FIG. 3A and FIG. 3B, and includes three parts: a terminal (including various I/O devices 370), a desktop management system (371), and remote virtual desktop computers (372, 373, 374, and 375). The desktop management system (371) mainly manages registration of the remote virtual desktop computers (372, 373, 374, and 375) and a remote terminal (370), and manages login of a user to the remote virtual desktop. A system to which the USB device access method mentioned in the embodiments of the present application is applied includes a terminal and a server, and is internally divided into different services according to different functions for implementation. For example, the terminal may include a USB/serial/parallel service client, a display service client, an audio service client, a multimedia service client, and a key mouse service client. The USB/serial/parallel port service client interacts with the server to implement mapping and redirection of various peripherals. The display service client interacts with the server to deliver the remote virtual desktop to a terminal display. The audio service client interacts with the server to implement bi-directional audio mapping. The multimedia service client interacts with the server to implement multimedia service playing and recording. The key mouse service client interacts with the server to implement mapping of the keyboard and the mouse to the remote virtual desktop system.

In a remote virtual desktop use manner, compared with a conventional computer use manner, a USB redirection framework is added between a USB native driver and a physical USB device.

Figure 4:
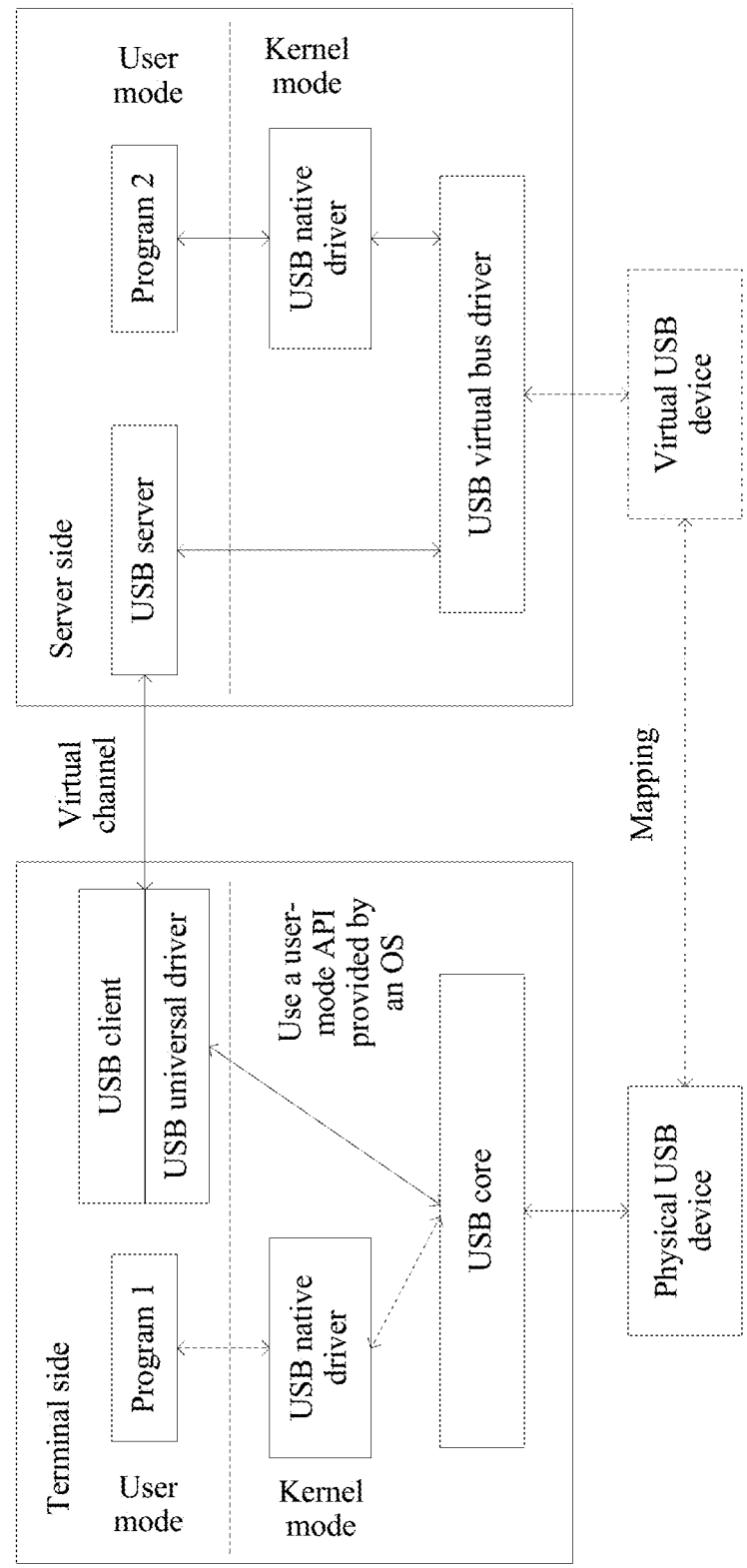
FIG. 4 is a schematic diagram of a USB redirection framework of a USB universal driver in a user mode according to an embodiment of the present application.

FIG. 4 is a USB redirection framework of a USB universal driver in a user mode according to an embodiment of the present application, where the USB redirection framework includes a terminal side and a server side. A framework body includes four parts: a USB universal driver, a USB client, a USB server, and a USB virtual bus driver. The USB universal driver and the USB client are located on the terminal side of the redirection framework, and the USB server and the USB virtual bus driver are located on the server side of the redirection framework. The USB universal driver works in a user mode on the terminal side, and is initialized by the USB client. Generally, the USB universal driver is integrated with the USB client, and runs in a same process as the USB client. Therefore, the terminal side needs only one integrated USB client. The USB client (including a function required by the USB universal driver) generally runs as an application program, and can monitor an insertion/removal event of the physical USB device in real time, can obtain a device list and status information of all current physical USB devices on the terminal side, and is responsible for establishing a virtual channel with the USB server. The USB server interacts with the USB client. The USB virtual bus driver works in a kernel mode of the server, and is loaded and initialized by an OS, and provides a capability of dynamically creating or deleting a virtual USB device to the USB server.

Figure 5:
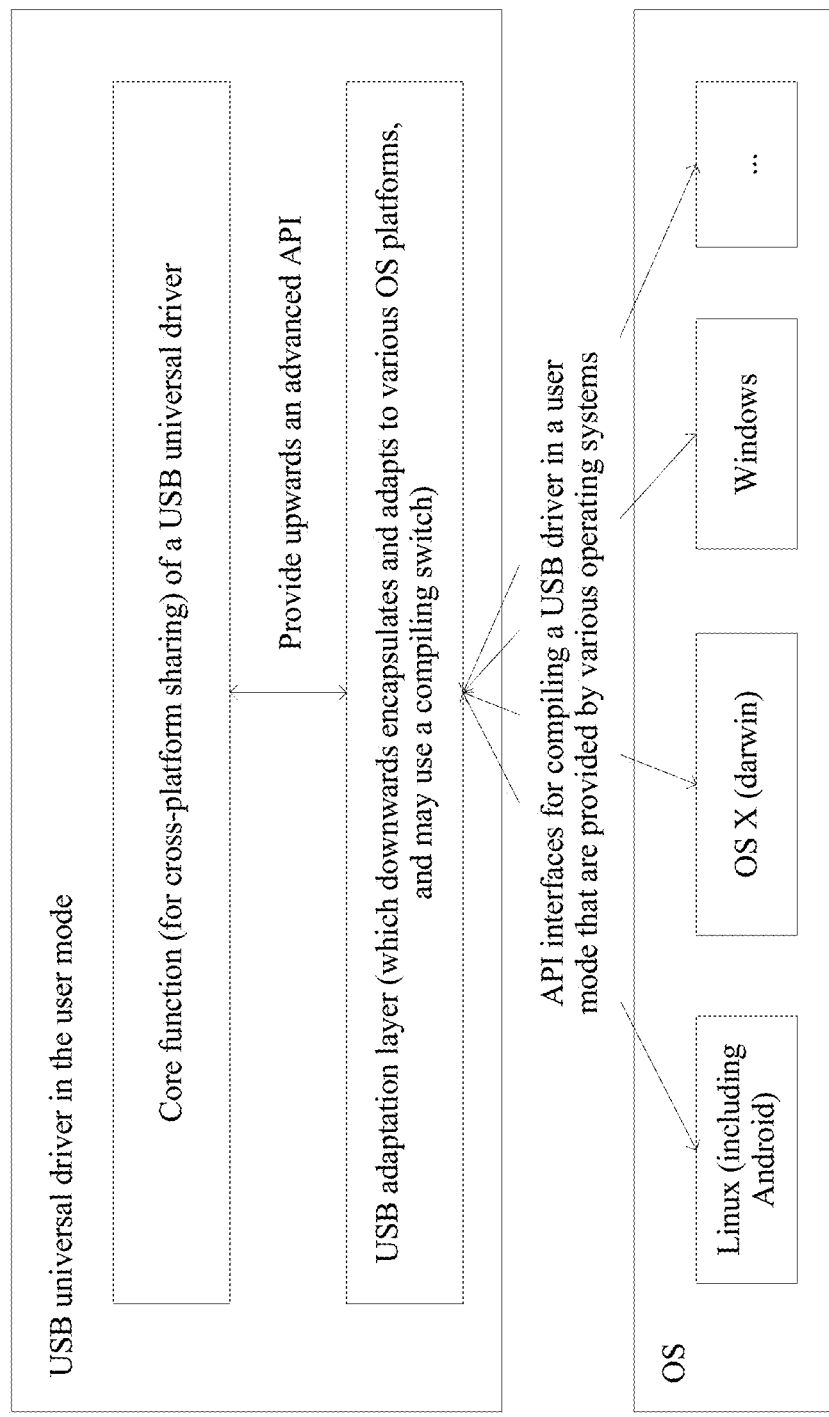
FIG. 5 is an exploded diagram of a USB universal driver in a user mode according to an embodiment of the present application.

Some Application Programming Interface (API) interfaces suitable for compiling a driver in a user mode that are provided upwards by the OS kernel are different on different OS platforms. Therefore, to enable a same "USB universal driver" to support multiple OS platforms across platforms, an adaptation layer needs to be abstracted to shield a difference between operating systems. The adaptation layer provides upwards a unified advanced API that is platform-independent, easy-to-use, and suitable for USB driver development, and downwards encapsulates and uses the API interfaces for compiling a USB driver in a user mode that are provided by various operating systems, to implement functions of these advanced APIs. In this way, the USB universal driver in the user mode may be decomposed into an architecture shown in FIG. 5. Using a driving mode based on a user mode implements a USB redirection function on the remote virtual desktop, eliminates a limitation of an application scenario of the USB redirection part, and resolves a problem that USB redirection and a terminal side OS platform are strongly related, so that it is easier to support multiple types of terminals and implement integration with a third-party terminal.

In a working process of the foregoing USB redirection framework, when a physical USB device is inserted into the terminal, the USB client detects an insertion event notification of the physical USB device. Then, the USB client obtains device information of the physical USB device, and uploads the obtained device information to the USB server. After receiving the device information, the USB server determines, according to a redirection mapping policy, whether the physical USB device may be mapped to the remote virtual desktop system. If the physical USB device may be mapped to the remote virtual desktop system, the USB server delivers a redirection enabling notification to the terminal, and after the physical USB device successfully enables the redirection function, creates a virtual USB device corresponding to the physical USB device.

After the inserted physical USB device is successfully mapped to the remote virtual desktop, if the USB virtual bus driver obtains an I/O access request or another access request of a user for the virtual USB device, the USB virtual bus driver encapsulates the access request into operation request information. The USB server reads the operation request message and delivers the operation request message to the USB client. After determining that the operation request message needs to be forwarded to the physical USB device, the USB client sends the operation request message to the physical USB device, and the physical USB device responds to the operation request message.

Figure 6:
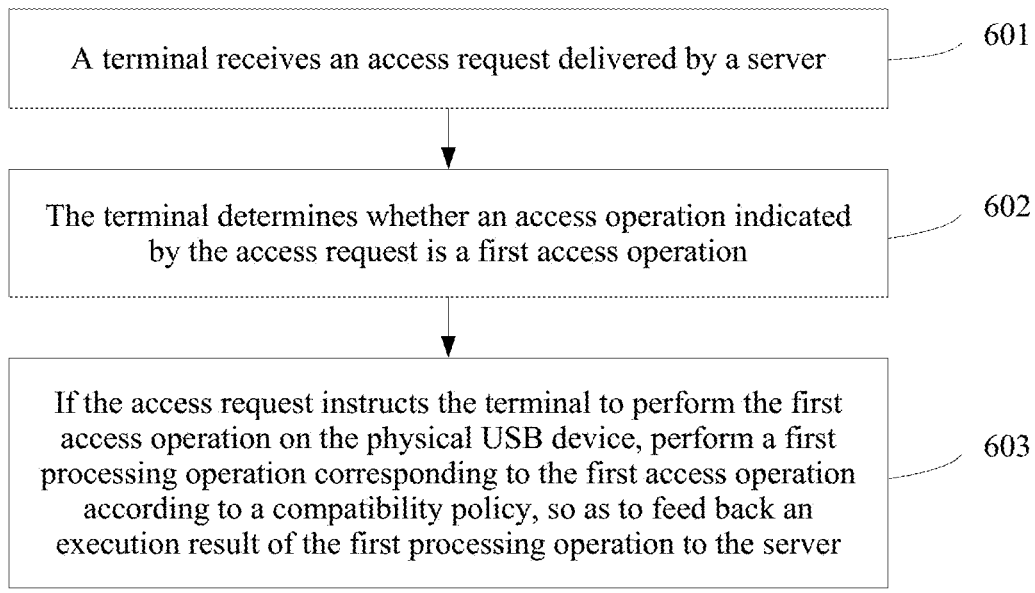
FIG. 6 is a flowchart of a USB device access method according to an embodiment of the present application.

FIG. 6 is a flowchart of a USB device access method according to an embodiment of the present application. Referring to FIG. 6, a procedure of the method provided in this embodiment of the present application includes the following steps.

601. A terminal receives an access request delivered by a server.

The access request is triggered by the server when detecting an operation performed on a virtual USB device.

602. The terminal determines whether an access operation indicated by the access request is a first access operation, and if the access request instructs the terminal to perform the first access operation on a physical USB device, the following step 603 is performed.

603. If the access request instructs the terminal to perform the first access operation on the physical USB device, perform a first processing operation corresponding to the first access operation according to a compatibility policy, so as to feed back an execution result of the first processing operation to the server.

The compatibility policy records a correspondence between the first access operation expected to be performed by the server on the physical USB device and the first processing operation performed by the terminal in response to the first access operation, and the first processing operation is an action performed by the terminal in response to the first access operation when the physical USB device does not support the first access operation.

According to the method provided in this embodiment of the present application, after the server creates the virtual USB device corresponding to the physical USB device accessed by the terminal, if the terminal receives the access request sent by the server for the virtual USB device, the terminal performs the first processing operation corresponding to the first access operation according to the stored compatibility policy after determining that the access operation indicated by the access request is the first access operation. Because the action performed by the terminal in response to the first access operation when the physical USB device does not support the first access operation is set in the compatibility policy, even if the physical USB device is not designed according to the standard USB protocol specification, the physical USB device can still perform correct redirection according to the access request, improving a compatibility capability of USB redirection, and resolving a problem that some physical USB devices that are not designed according to a standard USB protocol specification cannot be redirected, so as to ensure that a user properly uses a physical USB device.

Optionally, if the physical USB device supports implementation of a second access operation that has a same function as the first access operation and that is different from the first access operation, the first processing operation includes a second access operation performed by the terminal on the physical USB device, and obtaining an execution result of the second access operation performed on the physical USB device.

If the physical USB device does not support implementation of another access operation that has a same function as the first access operation and that is different from the first access operation, the first processing operation includes the terminal directly obtains a response result of the first access operation.

Optionally, the compatibility policy is obtained by the server by matching according to device information of the physical USB device, and is delivered to the terminal.

Optionally, the method further includes, if the physical USB device supports implementation of another access operation that has a function different from a function of the first access operation, performing, on the physical USB device, another access operation indicated by the access request, and obtaining an execution result of the another access operation performed on the physical USB device, so as to feed back the execution result of the another access operation to the server.

Optionally, a first processing policy is obtained and delivered to the terminal by the server according to the device information of the physical USB device when learning that the terminal accesses the physical USB device, where the first processing policy instructs the terminal to periodically read data from the physical USB device and cache the read data; and the method further includes executing, by the terminal, the first processing policy, so that when responding to a request of the server for expecting to read data from the physical USB device, the terminal directly feeds back cached data to the server.

Optionally, a second processing policy is obtained and delivered to the terminal by the server according to the device information of the physical USB device when learning that the terminal accesses the physical USB device, and the method further includes executing, by the terminal, the second processing policy, where the second processing policy instructs the terminal to compress data obtained by accessing the physical USB device, so as to feed back the compressed data to the server.

Optionally, the server provides a remote virtual desktop for user operation on the terminal using a virtual desktop system, and provides an access interface of the virtual USB device on the remote virtual desktop, so that a user operates the access interface to trigger the server to generate the access request.

All the foregoing optional technical solutions may be randomly combined to form optional embodiments of the present application, and details are not described herein again.

Figure 7:
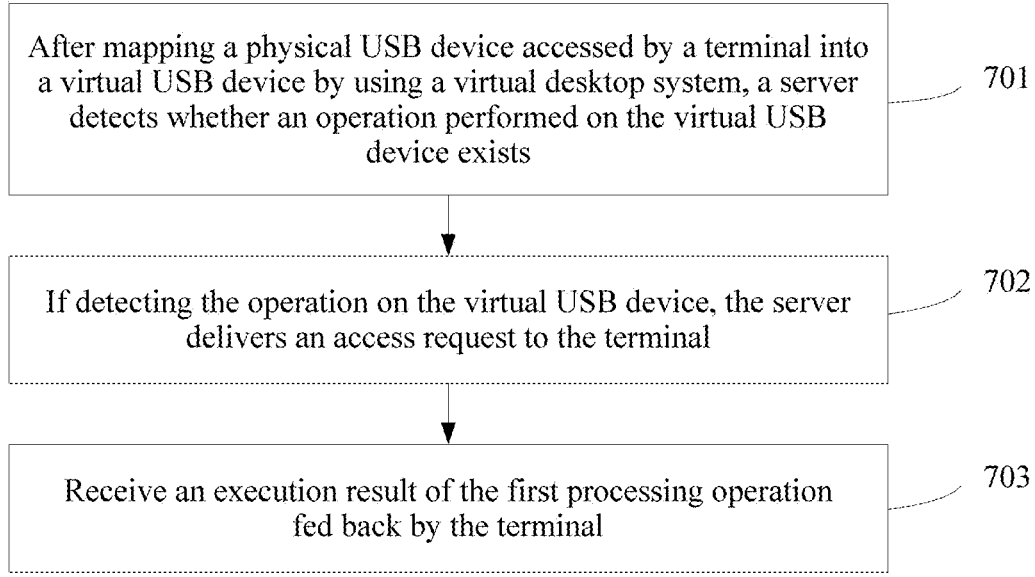
FIG. 7 is a flowchart of a USB device access method according to an embodiment of the present application.

FIG. 7 is a flowchart of a USB device access method according to an embodiment of the present application. Referring to FIG. 7, a procedure of the method provided in this embodiment of the present application includes the following steps.

701. After mapping a physical USB device accessed by a terminal into a virtual USB device using a virtual desktop system, a server detects whether an operation performed on the virtual USB device exists.

702. If detecting the operation on the virtual USB device, the server delivers an access request to the terminal.

After determining that the access request instructs to perform a first access operation on the physical USB device, the terminal performs a first processing operation corresponding to the first access operation according to a compatibility policy delivered by the server.

703. Receive an execution result of the first processing operation fed back by the terminal.

The compatibility policy records a correspondence between the first access operation expected to be performed by the server on the physical USB device and the first processing operation performed by the terminal in response to the first access operation, and the first processing operation is an action performed by the terminal in response to the first access operation when the physical USB device does not support the first access operation.

According to the method provided in this embodiment of the present application, after creating the virtual USB device corresponding to the physical USB device accessed by the terminal, the server delivers the access request for the virtual USB device to the terminal. After determining that the access operation indicated by the access request is the first access operation, the terminal performs the first processing operation corresponding to the first access operation according to the stored compatibility policy. Because the action performed by the terminal in response to the first access operation when the physical USB device does not support the first access operation is set in the compatibility policy, even if the physical USB device is not designed according to the standard USB protocol specification, the physical USB device can still perform correct redirection according to the access request, improving a compatibility capability of USB redirection, and resolving a problem that some physical USB devices that are not designed according to a standard USB protocol specification cannot be redirected, so as to ensure that a user properly uses a physical USB device.

Optionally, the method further includes obtaining a compatibility policy that matches device information of the physical USB device; and delivering the compatibility policy to the terminal.

Optionally, before the obtaining a compatibility policy that matches device information of the physical USB device, the method further includes obtaining the first access operation that is not supported by the physical USB device, the first processing operation that is set for the first access operation, and the device information of the physical USB device; and recording a correspondence among the first access operation, the first processing operation, and the device information of the physical USB device into the compatibility policy.

Optionally, the method further includes setting a first processing policy for the physical USB device, where the first processing policy is used to instruct the terminal to periodically read data from the physical USB device and cache the read data; storing a correspondence between the first processing policy and device information of the physical USB device; when it is learned that the terminal accesses the physical USB device, obtaining and delivering the first processing policy to the terminal according to the device information of the physical USB device, so that the terminal executes the first processing policy; and receiving cached data that is fed back by the terminal when the terminal responds to a request of the server for expecting to read data from the physical USB device.

Optionally, the method further includes setting a second processing policy for the physical USB device, where the second processing policy is used to instruct the terminal to compress data obtained by accessing the physical USB device; storing a correspondence between the second processing policy and device information of the physical USB device; when it is learned that the terminal accesses the physical USB device, obtaining and delivering the second processing policy to the terminal according to the device information of the physical USB device, so that the terminal executes the second processing policy; and receiving the compressed data fed back by the terminal.

All the foregoing optional technical solutions may be randomly combined to form optional embodiments of the present application, and details are not described herein again.

Figure 8A:
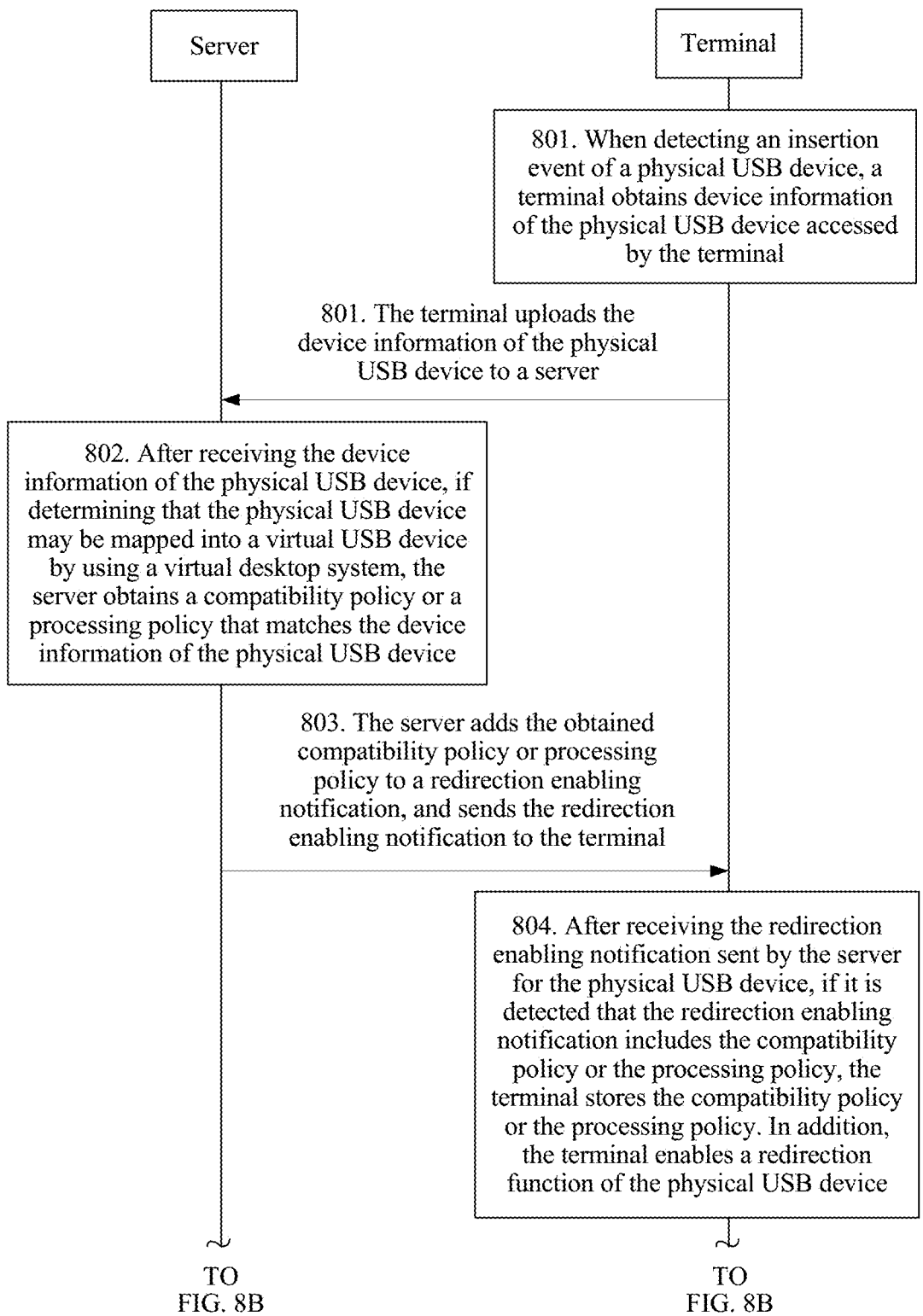
FIG. 8A and FIG. 8B are a flowchart of a USB device access method according to an embodiment of the present application.
Figure 8B:
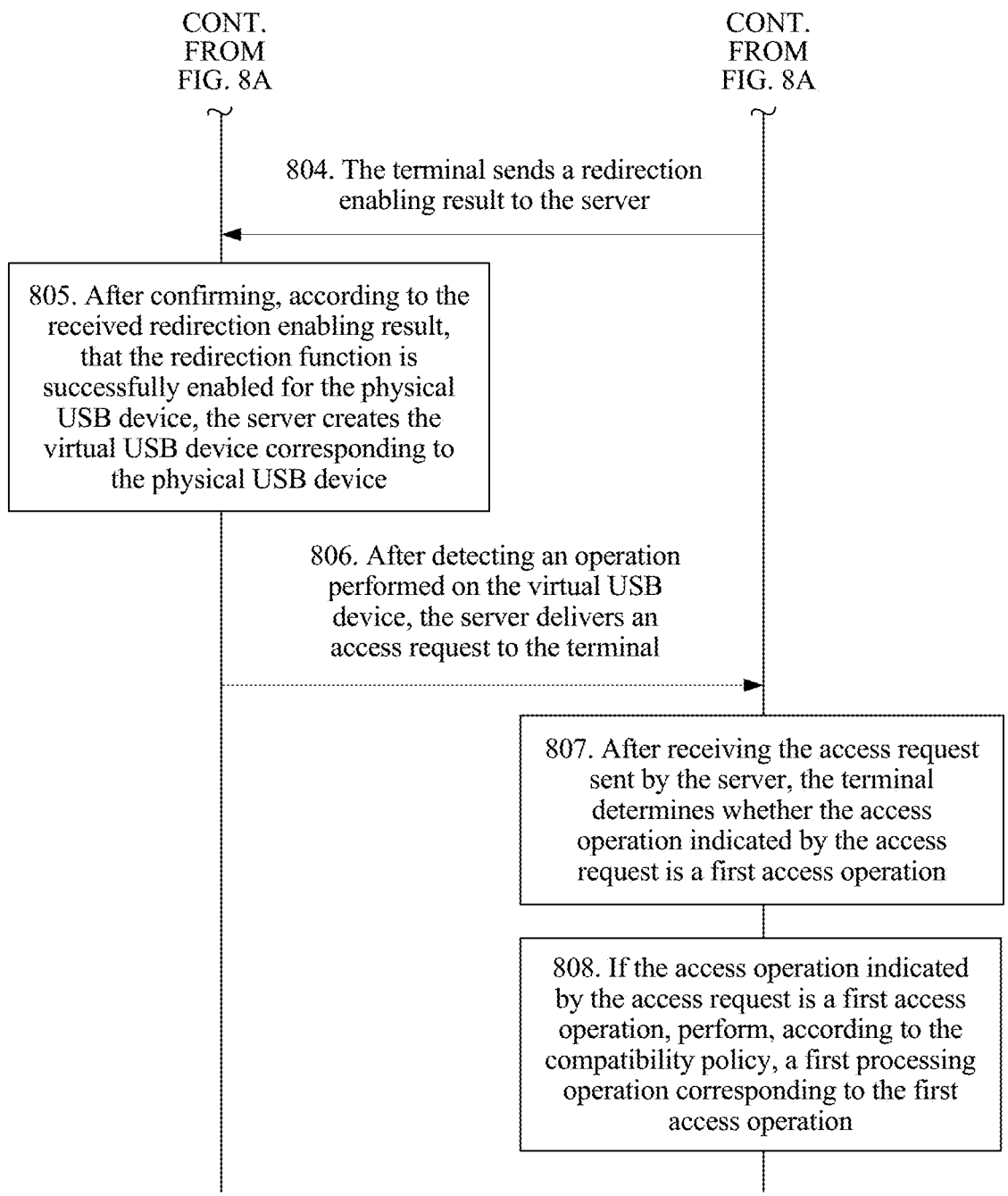

FIG. 8A and FIG. 8B are a flowchart of a USB device access method according to an embodiment of the present application. Referring to FIG. 8A and FIG. 8B, a procedure of the method provided in this embodiment of the present application includes the following steps.

801. When detecting an insertion event of a physical USB device, a terminal obtains device information of the physical USB device accessed by the terminal, and uploads the device information of the physical USB device to a server.

In this embodiment of the present application, when the physical USB device is inserted on a local terminal side, a USB client detects an insertion event of the physical USB device. Then, the USB client obtains device information of the inserted physical USB device, encapsulates the device information, and sends the device information to a USB server on a server side.

The server is a remote data center. The device information includes at least a device instance identifier of the physical USB device and descriptor information of the physical USB device, for example, a supplier ID (idVendor), a product ID (idProduct), a device delivery code (bcdDevice), a device type code (bDeviceClass), a device subtype code (bDeviceSubClass), and a device protocol code (bDeviceProtocol). This is not limited in this embodiment of the present application.

802. After receiving the device information of the physical USB device, if determining that the physical USB device may be mapped into a virtual USB device using a virtual desktop system, the server obtains a compatibility policy or a processing policy that matches the device information of the physical USB device.

The compatibility policy records a correspondence between the first access operation expected to be performed by the server on the physical USB device and the first processing operation performed by the terminal in response to the first access operation. The first access operation is an access operation performed on a non-standard behavior collected by a known physical USB device.

The processing policy indicates a processing manner of an advanced function of the physical USB device, and includes at least a first processing policy and a second processing policy. The first processing policy such as an interrupt transmission simulation mechanism instructs the terminal to periodically read data from the physical USB device and cache the read data. The second processing policy such as a lossless compression mechanism instructs the terminal to compress data obtained by accessing the physical USB device, so as to feed back the compressed data to the server.

Generally, a USB redirection framework provides a management policy configuration means for redirection mapping. A redirection mapping policy is configured according to a configuration rule to flexibly control whether the physical USB device is allowed to be redirected. A common management policy configuration means is as follows.

First, a general switch for redirecting the physical USB device is provided. Whether the physical USB device is allowed to be mapped into a virtual USB device using a virtual desktop system is configured.

Second, a set of configuration rules for the physical USB device to support a wildcard is defined to configure the device information as a specified matching condition value of the physical USB device such as an idVendor, an idProduct, a bcdDevice, a bDeviceClass, a bDeviceSubClass, or a bDeviceProtocol. For a physical USB device whose device information meets a matching condition, whether the physical USB device is allowed or not allowed to be redirected is controlled. An example of a mapping policy configuration rule is as follows:

rule:=(ALLOW|DENY):(match (match)*)?;
match:=(idVendor|idProduct|bcdDevice|bDeviceClass|bDeviceSubClass|bDeviceProtocol)=hex-number.

A maximum value of hex-number of (bDeviceClass, bDeviceSubClass, and bDeviceProtocol) is FF, and a maximum value of hex-number of (idVendor, idProduct, and bcdDevice) is FFFF. For example, the redirection mapping policy is DENY: bDeviceClass=0E, which indicates that a video class physical USB device whose device type code bDeviceClass is 0E is not allowed to be redirected. If the server detects that a value of bDeviceClass in the device information is 0E, it is determined that the physical USB device is not allowed to be redirected, that is, the physical USB device cannot be mapped into a virtual USB device using the virtual desktop system. If the value of bDevice- Class in the device information is not 0E, it is determined that the physical USB device is allowed to be redirected, that is, the physical USB device can be mapped into a virtual USB device using the virtual desktop system.

In this embodiment of the present application, for some physical USB devices that are not designed according to a standard USB protocol specification, the physical USB devices may have a non-standard behavior. As a result, in a redirection process, if an access operation that is not supported by the physical USB devices and that is for the non-standard behavior is not processed, the physical USB devices cannot perform correct redirection according to the access operation, or even cannot implement redirection, and consequently cannot properly work. To enable the physical USB devices with a non-standard behavior to properly work in the redirection process, and improve compatibility of the USB redirection framework for the physical USB devices, the USB redirection framework shown in this embodiment of the present application provides a first processing operation corresponding to an access operation for a non-standard behavior. That is, before the physical USB device is mapped into the virtual USB device using the virtual desktop system, a software parameter value such as 0x00000001 may be set for each known non-standard behavior of the known physical USB device, and a first processing operation corresponding to an access operation (that is, a first access operation) for each known non-standard behavior is defined, and a non-standard behavior list is obtained. A form of the non-standard behavior list may be shown in Table 1.

ior, a software parameter value for the known non-standard behavior, and a first processing operation, so as to generate a non-standard behavior list.

As shown in Table 1, one software parameter value in Table 1 corresponds to one access operation and a processing operation for the access operation. That is, a software parameter value records a correspondence between an access operation and a processing operation. Therefore, in a specific implementation process, a correspondence between a first access operation and a first processing operation in a compatibility policy may be recorded using a software parameter value in the non-standard behavior list. The correspondence is used to instruct the terminal to perform, when detecting that the compatibility policy includes the software parameter value, the first processing operation corresponding to the first access operation. In this way, after the first access operation that is not supported by the physical USB device, the first processing operation that is set for the first access operation, and device information of the physical USB device are obtained, a correspondence between the device information of the physical USB device and the software parameter value is recorded in the compatibility policy, that is, a correspondence among the first access operation, the first processing operation, and the device information of the physical USB device is recorded in the compatibility policy.

Optionally, the USB redirection framework provides two mechanisms for implementing a compatibility policy, that is, a whitelist mechanism and a software parameter mechanism.

TABLE 1

| Sequence number | Non-standard behavior of USB device. | Software parameter value | Processing manner of USB redirection framework |
|---|---|---|---|
| 1 | Processing a device RESET resetting request is not supported. | 0x00000001 | If the USB redirection framework detects that this software parameter value is configured for the USB device, the USB redirection framework directly returns processing success when processing the operation request. |
| 2 | Processing an interface setting SET_INTERFACE request is not supported. | 0x00000002 | If the USB redirection framework detects that this software parameter value is configured for the USB device, when processing the operation request, the USB redirection framework attempts to convert the operation request into CLIENT_HALT request processing for all PIPEs under a specified INTERFACE, and finally returns processing success. |
| 3 | Obtaining a string of an index in configuration or interface description of the USB device is not supported. | 0x00000004 | If the USB redirection framework detects that this software parameter value is configured for the USB device, when processing the operation request, the USB redirection framework directly constructs a string meeting a format requirement and returns processing success. |
| 4 | ... | ... | ... |

The non-standard behavior list may be generated with reference to the following manner: obtaining a known non-standard behavior of a known physical USB device and a software parameter value that is set for each known non-standard behavior; setting a first processing operation corresponding to an access operation (that is, a first access operation) of each known non-standard behavior; and storing a correspondence among a known non-standard behav- In the whitelist mechanism, a whitelist is set, and device information of a known physical USB device and a software parameter value that is set for a known non-standard behavior of the known physical USB device are stored. In the software parameter mechanism, a software parameter list is set, and device information of a newly inserted physical USB device and a software parameter value that is set for a specified non-standard behavior of the newly inserted physical USB device are stored. The specified non-standard behavior is the foregoing known non-standard behavior. In this way, the compatibility policy that matches the device information of the physical USB device is obtained, that is, a software parameter value that matches the device information of the physical USB device is obtained from the whitelist or the software parameter list.

The whitelist is set in the following manner: generating the whitelist according to the non-standard behavior list and the device information of the known physical USB device.

For a form of the whitelist, refer to Table 2, where ANY=0xFFFF indicates that this field may be ignored during matching. In a specific implementation process, information included in the whitelist is embedded in code implementation, so that when using a known physical USB device, a user can make the known physical USB device properly work without performing any extra operation.

TABLE 2

| Sequence number | Supplier ID (idVendor) | Product ID (idProduct) | Device delivery code (bcdDevice) | Software parameter value |
|---|---|---|---|---|
| 1 | 0x0525 | 0xA4A8 | ANY | 0x00000002 |
| 2 | 0xxxxxx | ANY | ANY | 0x00000012 |
| 3 | ... | ... | ... | ... |

The software parameter list is set in the following manner: if it is found that the newly inserted physical USB device has a specified non-standard behavior and the specified non-standard behavior is a known non-standard behavior, obtaining a software parameter value corresponding to the specified non-standard behavior from the non-standard behavior list; and adding a correspondence between device information of the newly inserted physical USB device and the software parameter value of the specified non-standard behavior to the software parameter list.

It should be noted that the newly inserted physical USB device is a physical USB device other than the known physical USB device. When this type of physical USB device is used, it may be detected through test whether the newly inserted physical USB device has a known non-standard behavior. If the newly inserted physical USB device has a known non-standard behavior, the known non-standard behavior and the device information of the newly inserted physical USB device are stored into the software parameter list. The software parameter list is an extension mechanism implemented by the USB redirection framework, and stores the device information of the newly inserted physical USB device and a software parameter value corresponding to a non-standard behavior of the newly inserted physical USB device. In this way, when the inserted physical USB device is not a physical USB device included in the whitelist, and when the physical USB device has a known non-standard behavior, the device information of the physical USB device and the corresponding software parameter value may be added to the software parameter list using a configuration user interface. Because processing code of the software parameter list is added to a corresponding module of the USB redirection framework, the physical USB device having a known non-standard behavior can properly work only by setting the software parameter list without modifying the code. This improves compatibility of the USB redirection framework.

In addition, to enhance applicability of the USB redirection framework, some advanced functions are pertinently provided in the USB redirection framework according to a feature of a USB protocol and impact of a network condition (such as a delay and bandwidth) and the like on USB redirection, so as to resolve special problems that may occur during use of some physical USB devices in an actual use scenario. This embodiment of the present application provides an advanced function list to store these special problems and their corresponding special processing policies. A process of setting the advanced function list is as follows: obtaining an advanced function that is set for a special problem that is encountered by the physical USB device; setting a special processing policy and a software parameter value corresponding to each advanced function, where the software parameter value indicates a special processing policy corresponding to the advanced function of the physical USB device; and storing a correspondence among the advanced function, the software parameter value that is set for the advanced function, and the special processing policy, and generating the advanced function list.

In this embodiment of the present application, when a physical USB device has a special problem, a software parameter value corresponding to the existing special problem may be obtained from the advanced function list, and a correspondence between device information of the physical USB device and the software parameter value that is set for the advanced function is stored. In a process of implementing an advanced function of a physical USB device, a correspondence between device information of the physical USB device and a software parameter value that is set for the advanced function may be stored in a software parameter list, or stored in a whitelist, and a software parameter value that matches the device information of the physical USB device is obtained from the software parameter list or the whitelist. This embodiment of the present application sets no specific limitation thereto. In this way, a special processing policy that matches the device information of the physical USB device is obtained, that is, a software parameter value that matches the device information of the physical USB device is obtained from the whitelist or the software parameter list. The whitelist is embedded in the USB redirection framework, reducing a problem that software parameter configuration is still required subsequently to support the same USB device, and improving a compatibility capability by default. The advanced function list may also be considered as a special form of a non-standard behavior list. The form of the advanced function list may be shown in Table 3 below.

TABLE 3

| Sequence number | Advanced function of USB redirection framework | Software parameter value | Special processing of USB redirection framework |
|---|---|---|---|
| 1 | Provides a lossless compression mechanism to reduce bandwidth | 0x01000000 | If the USB redirection framework detects that this software parameter value is configured for the USB device, lossless |

TABLE 3-continued

| Sequence number | Advanced function of USB redirection framework | Software parameter value | Special processing of USB redirection framework |
|---|---|---|---|
| | communication traffic and save network bandwidth resources. | | compression processing is performed on communication data sent from a USB client to a USB server, and vice versa. |
| 2 | Provides an interrupt transmission simulation mechanism to resolve a problem that a device is sensitive to a network delay in an interrupt transmission mode, causing unavailability of the device. | 0x02000000 | If the USB redirection framework detects that this software parameter value is configured for the USB device, special processing is performed for interrupt transmission of the USB device. For a special processing manner, refer to subsequent description. |
| 3 | ... | ... | ... |

It should be noted that, when a server detects an operation on a virtual USB device, a USB native driver on a server side initiates an operation request for the USB device. The operation request needs to be forwarded through the USB redirection framework to a physical USB device accessed by the terminal. This process is affected by a network condition, for example, by a factor such as a network delay or bandwidth, and consequently some USB devices cannot properly work. Impact caused by a network delay factor is used as an example. For the interrupt transmission mode in the USB protocol, after the USB native driver initiates interrupt transmission, the USB native driver periodically queries, using an interrupt endpoint, whether the physical USB device on a terminal side has data that needs to be transmitted. However, because the network delay exists, a data reading period on the server side is inconsistent with a data reading period on the terminal side. Generally, the data reading period on the terminal side is greater than the data reading period on the server side. In this case, if a speed of generating data by the physical USB device exceeds a speed of fetching data by the terminal side, data that is not fetched in a timely manner on the terminal side is overwritten by newly received data, causing some data to be lost, and further, the physical USB device cannot properly work. Using an advanced function provided in the USB redirection framework can resolve a problem that this type of USB device cannot properly work in an actual application scenario.

It should be noted that, in the non-standard behavior list and the advanced function list, a corresponding software parameter value is set for each non-standard behavior or advanced function, and the software parameter value indicates a first processing operation for a first access operation for the non-standard behavior and a special processing policy for the advanced function. The software parameter value may be set to a binary value of 16 bits, 32 bits, or 64 bits, and this is not limited in this embodiment of the present application. Different bits represent different non-standard behaviors or advanced functions. In an example in which the software parameter value is a binary value of 32 bits, for example, there are three existing non-standard behaviors A, B, and C. A software parameter value of the non-standard behavior A is 0x00000001 and occupies the first bit of the 32 bits on the right. A software parameter value of the non-standard behavior B is 0x00000002, and occupies the second bit of the 32 bits on the right. A software parameter value of the non-standard behavior C is 0x00000004, and occupies the third bit of the 32 bits on the right. In this way, if a physical USB device has the non-standard behavior A and the non-standard behavior B, a software parameter value of the physical USB device is a "bitwise OR" operation result of the software parameter value of the non-standard behavior A and the software parameter value of the non-standard behavior B. The obtained software parameter value of the physical USB device is 0x00000003.

A manner of setting the software parameter value of the advanced function is the same as the foregoing manner, and details are not described herein again. For the physical USB device whose software parameter value is 0x00000003, if a "bitwise AND" operation result of the software parameter value of the physical USB device and each software parameter value in the non-standard behavior list or the advanced function list is consistent with a software parameter value in the non-standard behavior list or the advanced function list, it is determined that the physical USB device supports an access operation for the non-standard behavior corresponding to the software parameter value, or it is determined that the advanced function corresponding to the software parameter value may be enabled for the physical USB device.

In this embodiment of the present application, when a USB client on the terminal side detects that a physical USB device is inserted, the USB client obtains device information of the physical USB device, and uploads the device information to a USB server at the server side. After receiving the device information, the USB server on the server side determines, according to a stored redirection mapping policy, whether the physical USB device is allowed to be mapped into a virtual USB device using a virtual desktop system. If the physical USB device is allowed to be mapped into a virtual USB device using a virtual desktop system, the USB server searches, according to the device information, whether a software parameter value that matches the device information exists in the whitelist or the software parameter list. If a software parameter value that matches the device information exists in the whitelist or the software parameter list, the USB server obtains a software parameter value that matches the device information of the physical USB device.

It should be noted that a compatibility policy and a processing policy that match the device information of the physical USB device may be obtained and delivered to the terminal by the server when learning that the terminal accesses the physical USB device. For example, the compatibility policy and the processing policy are carried in a redirection enabling notification and sent to the terminal. Alternatively, after the physical USB device accesses the terminal, the terminal sends an obtaining message to the server according to a requirement. After receiving the obtaining message, the server obtains the compatibility policy and the processing policy and delivers them to the terminal. This is not limited in this embodiment of the present application. In this embodiment of the present application, only an example in which the compatibility policy or the processing policy is carried in the redirection enabling notification is used for description.

803. The server adds the obtained compatibility policy or processing policy to a redirection enabling notification, and sends the redirection enabling notification to the terminal.

In this embodiment of the present application, after determining that the physical USB device can be mapped into the virtual USB device using the virtual desktop system, the USB server on the server side sends the redirection enabling notification to the USB client of the terminal. If the USB server reads the software parameter value that matches the device information of the physical USB device in the whitelist or the software parameter list, the USB server encapsulates at least the software parameter value and the device information of the physical USB device as additional information into the redirection enabling notification. If the software parameter value that matches the device information of the physical USB device is not read, the USB server directly sends, to the USB client, the redirection enabling notification that does not carry an additional message.

804. After receiving the redirection enabling notification sent by the server for the physical USB device, if it is detected that the redirection enabling notification includes the compatibility policy or the processing policy, the terminal stores the compatibility policy or the processing policy. In addition, the terminal enables a redirection function of the physical USB device, and sends a redirection enabling result to the server.

In this embodiment of the present application, after receiving the redirection enabling notification for the physical USB device, the USB client on the terminal side checks whether the redirection enabling notification carries the additional message that matches the device information of the physical USB device. If the redirection enabling notification carries the additional message, the USB client stores the software parameter value included in the additional message in a device instance corresponding to the device information of the physical USB device, so that the software parameter value is used subsequently when processing is performed on an access operation for a non-standard behavior or an advanced function of the physical USB device. In addition, the USB client performs an operation of enabling the redirection function of the physical USB device, allowing the physical USB device to be redirected. After performing the operation of enabling the redirection function of the physical USB device, the USB client sends a redirection enabling result to the USB server on the server side. If enabling the redirection function succeeds, an operation success result is sent. If enabling the redirection function fails, an operation failure result is sent.

It should be noted that, the software parameter value in the received additional information is obtained by the server from the software parameter list or the whitelist, and the software parameter list and the whitelist may record the correspondence between the device information of the known physical USB device and the software parameter value that is set for the advanced function. Therefore, if the received software parameter value is corresponding to any advanced function, the advanced function is enabled for the physical USB device. The advanced function is an advanced function recorded in the advanced function list, including a function of resolving a specific problem that is encountered by the physical USB device in an actual application scenario, for example, an interrupt transmission simulation mechanism, a lossless compression mechanism, or the like. This is not limited in the present application.

It should be noted that an advanced function of the lossless compression mechanism is added, so that in a process of communication between the USB client and the USB server, one end performs lossless compression on to-be-sent data and the other end receives the data and performs lossless decompression to restore the message, reducing network transmission bandwidth occupied in the communication process. Because lossless compression is not ideal for a compression effect of data exchanged between all physical USB devices, and enabling the lossless compression function relatively prolongs an interaction time, the lossless compression function is disabled by default. When the lossless compression function needs to be enabled for a physical USB device, a software parameter value corresponding to the lossless compression function may be set in the software parameter list or the whitelist. Then, after the software parameter value that matches the device information of the physical USB device is detected, the lossless compression function may be enabled for the physical USB device.

It should be noted that a principle of the interrupt transmission simulation mechanism is as follows: an interrupt transmission URB (USB request block) message input request of a physical USB device is actively constructed, and sending the interrupt transmission URB message input request to the physical USB device inserted on the terminal side is simulated, so as to read data generated by the physical USB device at this time, so that the interrupt data generated by the physical USB device may be fetched in a timely manner. Then, the fetched interrupt data is cached. After there is an actual interrupt transmission URB message input request, the interrupt data is first obtained from the cache area. For a URB message structure of an interrupt transmission URB message input request of a same interrupt endpoint, the URB message structure may be autonomously constructed according to information such as a port descriptor. Alternatively, a first actual interrupt transmission URB message input request of the interrupt endpoint of the physical USB device may be intercepted and stored, and a corresponding URB message structure is subsequently constructed according to the stored URB message structure. This is not limited in this embodiment of the present application. The advanced function of the interrupt transmission simulation mechanism is also disabled by default. When the interrupt transmission simulation function needs to be enabled for a physical USB device, a software parameter value corresponding to the interrupt transmission simulation function may be set in the software parameter list or the whitelist. Then, after the software parameter value that matches the device information of the physical USB device is detected, the interrupt transmission simulation function may be enabled for the physical USB device. An implementation in which the terminal side actively initiates interrupt transmission simulation and data obtained by means of interruption and polling from the physical USB device is cached on the terminal side is used as an example, and a process of implementing the interrupt transmission simulation mechanism is as follows.

First, after completing enabling configuration for the physical USB device, the USB client on the terminal side enters an interrupt transmission working stage. When detecting the first actual interrupt transmission URB message input request for the interrupt endpoint of the physical USB device, the USB client stores the URB message and sends the URB message to the physical USB device at the same time.

Second, if the USB client receives an error code returned by the physical USB device for the URB message, the USB client stops subsequent simulation. Otherwise, the USB client caches the read data, constructs a URB message of a same structure, and sends the URB message to the physical USB device by simulation, so as to read interrupt data to be generated next time. In this way, an active interrupt transmission URB message input request that is not affected by a network factor may always exist on the terminal side, and data generated by the physical USB device can be fetched in a timely manner, so as to ensure that the data is not lost.

Next, when detecting that the USB server has an actual interrupt transmission URB message input request, the USB client obtains corresponding data from a cache queue according to a first in first out rule, and sends the data to the server.

Finally, when the USB client detects an operation such as resetting of the interrupt endpoint of the physical USB device, the USB client indicates that this round of interrupt transmission ends, and the USB client clears the cache queue, and prepares to enter a next round of interrupt transmission.

In this embodiment of the present application, a policy of enabling the advanced function of the interrupt transmission simulation mechanism is referred to as a first processing policy. When the first processing policy is performed on the physical USB device, the advanced function of the interrupt transmission simulation mechanism is enabled for the physical USB device. Then, the USB client on the terminal side periodically reads data from the physical USB device and caches the read data. When the USB server sends a data read request to the USB client, the USB client directly feeds back the cached data to the USB server. A policy of enabling the advanced function of the lossless compression mechanism is referred to as a second processing policy. When the second processing policy is performed on the physical USB device, the advanced function of the lossless compression mechanism is enabled for the physical USB device. Then, the terminal compresses data obtained by accessing the physical USB device, and feeds back the compressed data to the server. When a special processing policy is set, a corresponding software parameter value is separately set for the first processing policy and the second processing policy, so that when the terminal receives the software parameter value that matches the device information of the accessed physical USB device and that indicates the advanced function, the terminal enables the advanced function corresponding to the software parameter value for the accessed physical USB device. The advanced function corresponding to the software parameter value may also be enabled when the accessed physical USB device needs to perform corresponding data transmission. This is not limited in this embodiment of the present application.

805. After confirming, according to the received redirection enabling result, that the redirection function is successfully enabled for the physical USB device, the server creates the virtual USB device corresponding to the physical USB device.

Figure 9A:
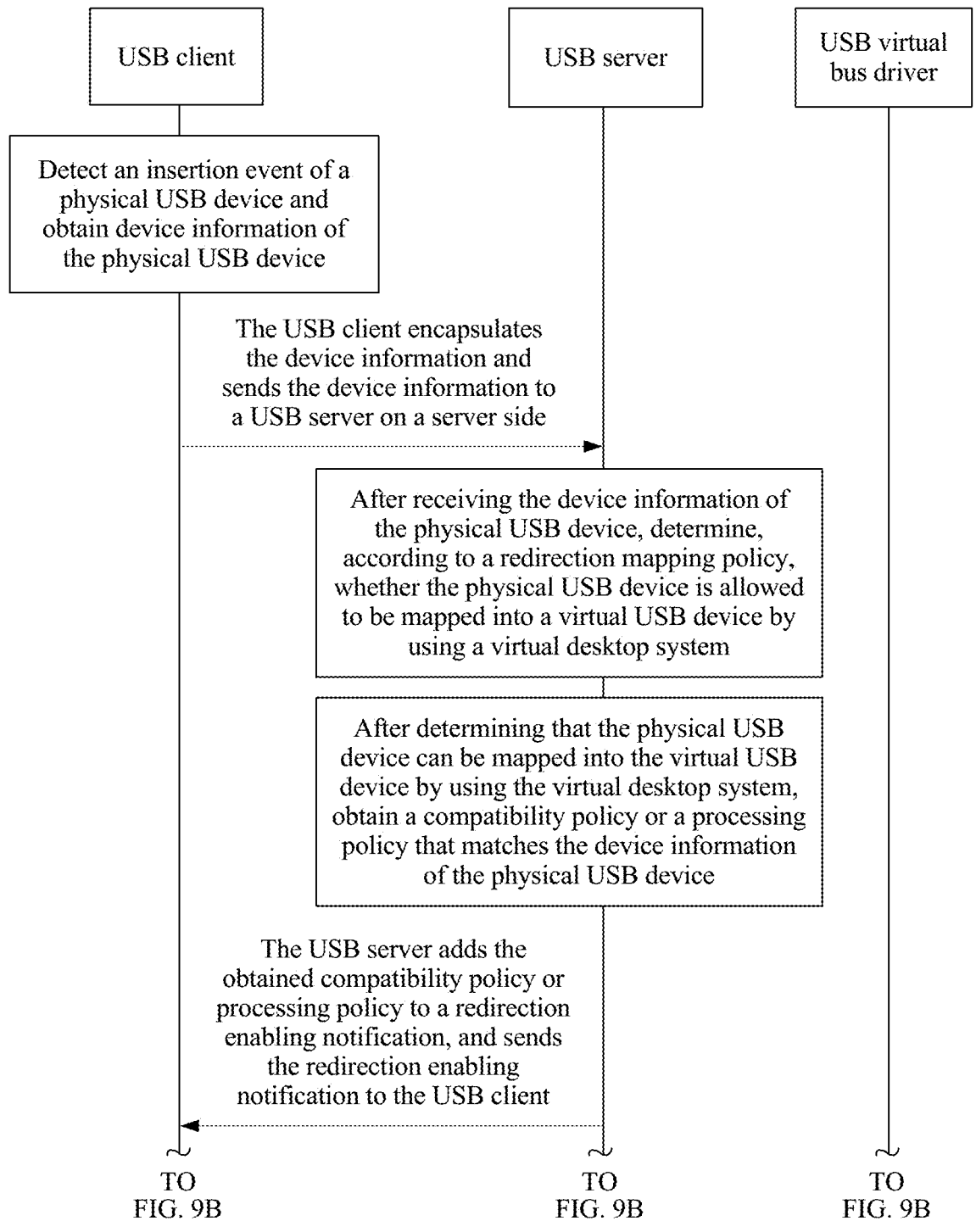
FIG. 9A and FIG. 9B are a flowchart of mapping a physical USB device to a remote virtual desktop system according to an embodiment of the present application.
Figure 9B:
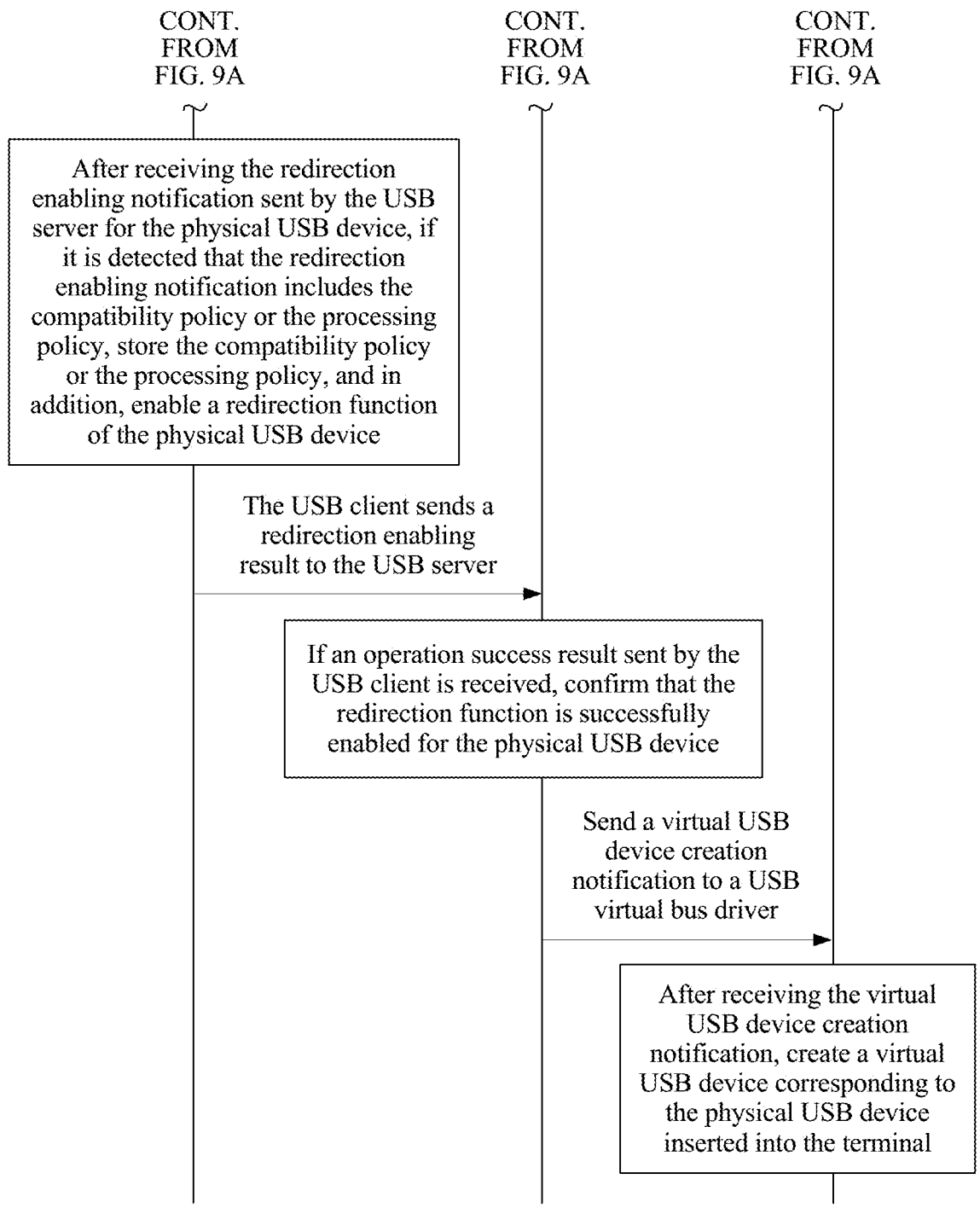

In this embodiment of the present application, if the USB server on the server side receives the operation success result sent by the USB client, it is confirmed that the redirection function is successfully enabled for the physical USB device. Then, the USB server sends a virtual USB device creation notification to the USB virtual bus driver. After receiving the virtual USB device creation notification, the USB virtual bus driver creates, at the server end, a virtual USB device corresponding to the physical USB device inserted into the terminal. In this case, the physical USB device inserted on the terminal side is successfully mapped to the remote virtual desktop system. For a specific procedure of mapping the physical USB device inserted into the terminal to the remote virtual desktop, refer to FIG. 9A and FIG. 9B.

806. After detecting an operation performed on the virtual USB device, the server delivers an access request to the terminal.

In this embodiment of the present application, the server provides a remote virtual desktop for user operation on the terminal side using the virtual desktop system, and provides an access interface of the virtual USB device on the remote virtual desktop, so that a user operates the access interface to trigger the server to generate an access request. After the physical USB device on the terminal side is successfully mapped to the remote virtual desktop system, if the USB virtual bus driver on the server side obtains an I/O request operation or another access control operation of the user for the virtual USB device, the USB virtual bus driver encapsulates the request operation or the access control operation into an access request. The USB server reads and forwards the access request to the terminal. After receiving the access request, the USB client on the terminal side performs corresponding processing on the physical USB device according to the access operation indicated by the access request. That is, the USB client on the terminal side determines, according to context information, whether to forward the access request to the physical USB device. The physical USB device performs the access operation and feeds back a response result to the USB client. The USB client sends the response result to the USB server on the server side, so as to complete redirection of the USB message. For a specific process, refer to step 807 and step 808.

807. After receiving the access request sent by the server, the terminal determines whether the access operation indicated by the access request is a first access operation, and if the access operation indicated by the access request is a first access operation, the following step 808 is performed.

Figure 10:
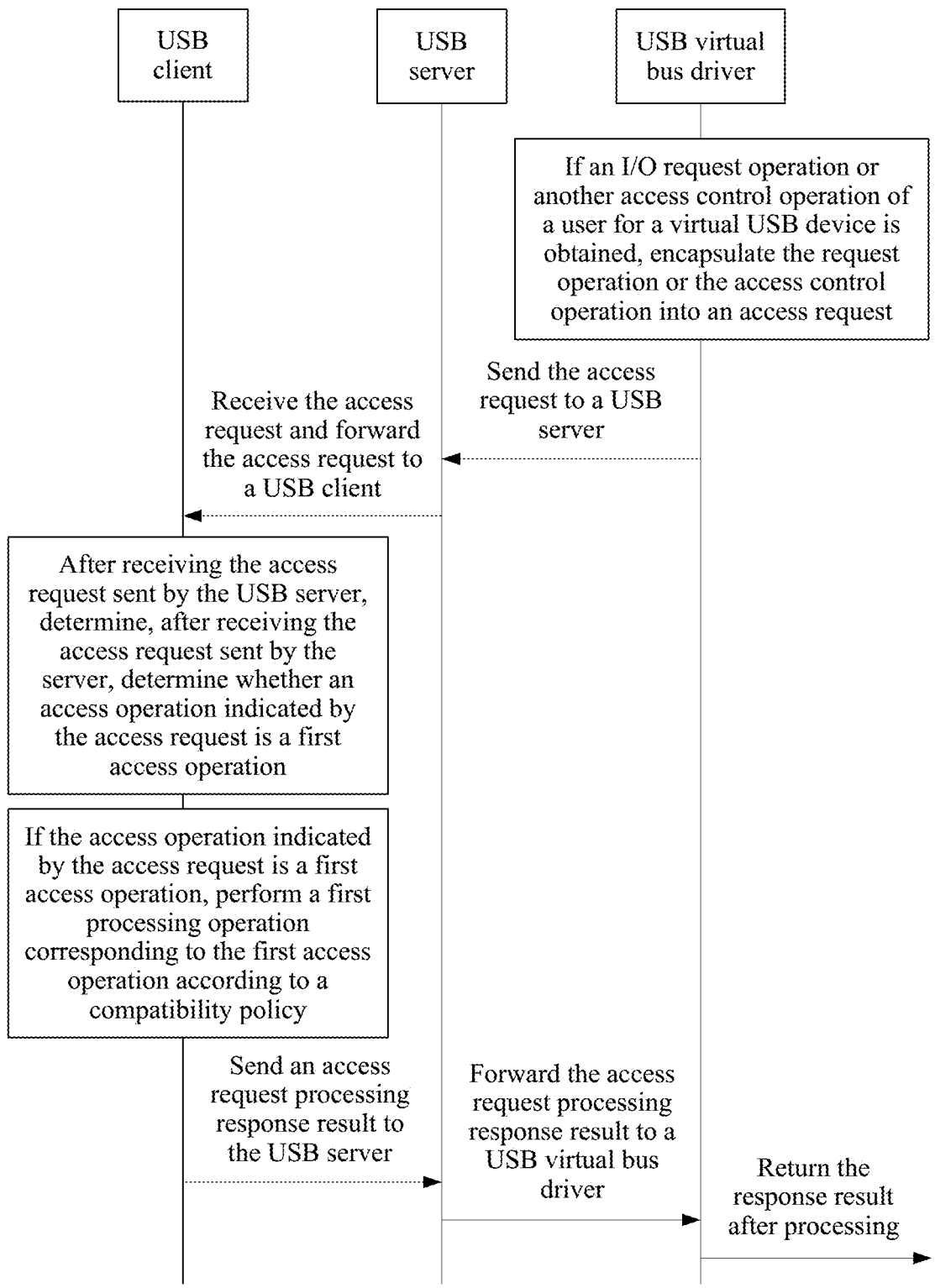
FIG. 10 is a flowchart of message redirection according to an embodiment of the present application.

In this embodiment of the present application, to ensure that a physical USB device that may have a non-standard behavior can properly work, the USB client on the terminal side determines, after receiving the access request sent by the USB server on the server side for the virtual USB device, whether the access operation indicated by the access request is a first access operation. If it is determined that the access operation indicated by the access request is a first access operation, the USB client performs a first processing operation corresponding to the first access operation according to the compatibility policy. For a processing procedure, refer to the following step 808 and FIG. 10.

Figure 11:
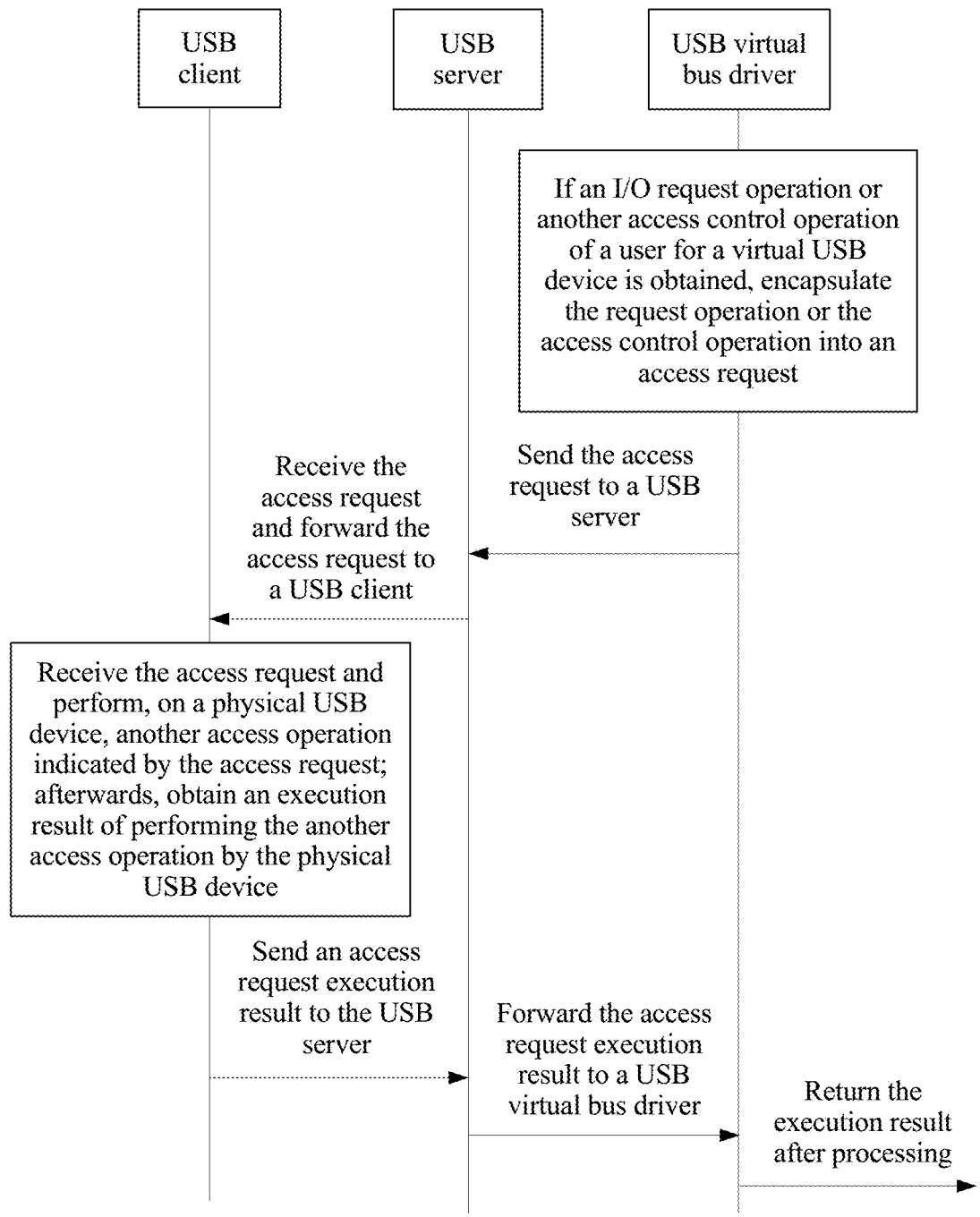
FIG. 11 is a flowchart of message redirection according to an embodiment of the present application.

If the physical USB device supports implementation of another access operation that has a function different from a function of the first access operation, that is, for a standard-compliant behavior operation, the USB client performs the access operation indicated by the access request for the physical USB device, that is, sends the access request to the physical USB device, and the physical USB device responds to the access request. Then, the USB client obtains an execution result of executing the access request by the physical USB device, and returns the execution result to the USB server. For details, refer to the procedure shown in FIG. 11.

808. If the access operation indicated by the access request is a first access operation, perform, according to the compatibility policy, a first processing operation corresponding to the first access operation.

In this embodiment of the present application, after it is determined that the access operation indicated by the access request is the first access operation, it further needs to be determined whether the physical USB device supports implementation of an access operation that has a same function as the first access operation and that is different from the first access operation. In the implementation of step 802, the server may set a software parameter value for a correspondence between the first access operation and the first processing operation in the compatibility policy, and the software parameter value has a correspondence with the device information of the physical USB device. Therefore, the terminal may determine, by determining whether the locally stored software parameter value includes the software parameter value that matches the device information of the physical USB device, whether the physical USB device supports implementation of the access operation that has a same function as the first access operation and that is different from the first access operation, including the following two determining manners.

In a first manner, searching is performed in a stored first configuration information list, and if the software parameter value that matches the device information of the physical USB device is found in the first configuration information list, it is determined that the physical USB device does not support implementation of the access operation that has a same function as the first access operation and that is different from the first access operation.

The first configuration information list may be a part of the software parameter list in the foregoing step 801, and stores a software parameter value corresponding to a known non-standard behavior of the newly inserted physical USB device.

In a second manner, searching is performed in a stored second configuration information list, and if the software parameter value of the physical USB device is found in the second configuration information list, it is determined that the physical USB device does not support implementation of the access operation that has a same function as the first access operation and that is different from the first access operation.

The second configuration information list may be a part of the whitelist in the foregoing step 801, and stores configuration information corresponding to the known non-standard behavior of the known physical USB device. The first configuration information list and the second configuration information list form a compatibility policy corresponding to the physical USB device accessed by the terminal.

If the physical USB device supports implementation of the second access operation that has a same function as the first access operation and that is different from the first access operation, the first processing operation includes a second access operation performed by the USB client on the terminal side on the physical USB device, and obtaining an execution result of the second access operation performed on the physical USB device, and feeding back the execution result to the USB server on the server side. That is, the USB client delivers the second access operation to the physical USB device, and the physical USB device responds to the second access operation.

If the physical USB device does not support implementation of another access operation that has a same function as the first access operation and that is different from the first access operation, the first processing operation includes the USB client on the terminal side directly obtains a response result of the first access operation, and sends the response result to the USB server on the server side. For a detailed procedure, refer to FIG. 10.

In this embodiment of the present application, because the software parameter value indicates the first processing operation performed for the first access operation, and the software parameter value may be stored in different configuration information lists according to different obtaining sources (for example, a whitelist or a software parameter list), the first processing operation may be performed according to the following three cases.

In a first case, if the software parameter value that matches the device information of the physical USB device is found only in the first configuration information list, the first processing operation corresponding to the software parameter value is performed.

In a second case, if the software parameter value that matches the device information of the physical USB device is found only in the second configuration information list, the first processing operation corresponding to the software parameter value is performed.

In a third case, if the software parameter value that matches the device information of the physical USB device is found in both the first configuration information list and the second configuration information list, it is determined whether the first processing operation corresponding to the software parameter value in the first configuration list conflicts with the first processing operation corresponding to the software parameter value in the second configuration information list. If a conflict exists, the first processing operation corresponding to the software parameter value in the first configuration information list is performed.

It should be noted that, in an implementation process, a software parameter value that matches the device information of the physical USB device may be preferentially searched for in the first configuration information list by setting. If the software parameter value that matches the device information of the physical USB device is found in the first configuration information list, the first processing operation corresponding to the software parameter value is directly performed. There is no need to search whether a software parameter value that matches the device information of the USB device exists in the second configuration information list.

According to the method provided in this embodiment of the present application, after receiving the device information of the physical USB device accessed by the terminal and determining that the redirection function is successfully enabled for the physical USB device, the server creates the virtual USB device corresponding to the physical USB device. Then, if the terminal receives the access request sent by the server for the virtual USB device, after determining that the access operation indicated by the access request is the first access operation, the terminal performs, according to the stored compatibility policy, a first processing operation corresponding to the first access operation. Because the action performed by the terminal in response to the first access operation when the physical USB device does not support the first access operation is set in the compatibility policy, even if the physical USB device is not designed according to the standard USB protocol specification, the physical USB device can still perform correct redirection according to the access request, improving a compatibility capability of USB redirection, and resolving a problem that some physical USB devices that are not designed according to a standard USB protocol specification cannot be redirected, so as to ensure that a user properly uses a physical USB device. In addition, in this embodiment of the present application, a processing policy that can improve work reliability and applicability is further set for the physical USB device, and the physical USB device can be controlled and activated using a compatibility policy, so that impact of a network condition (such as a delay or bandwidth) and the like on some USB devices may be reduced, ensuring a probability that the USB device can properly work.

Figure 12:
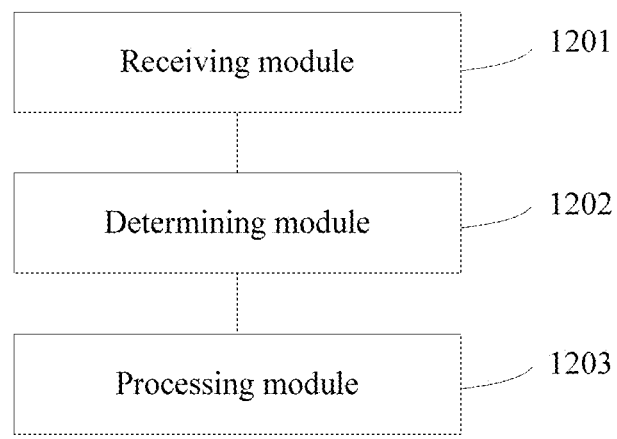
FIG. 12 is a block diagram of a USB device access apparatus according to an embodiment of the present application.

FIG. 12 is a schematic structural diagram of a USB device access apparatus according to an embodiment of the present application. Referring to FIG. 12, the apparatus includes a receiving module 1201, a determining module 1202, and a processing module 1203.

The receiving module 1201 is connected to the determining module 1202, and is configured to receive an access request delivered by a server, where the access request is triggered by the server when detecting an operation performed on a virtual USB device. The processing module 1202 is connected to the processing module 1203, and is configured to determine whether an access operation indicated by the access request is a first access operation. The processing module 1203 is configured to, if the access request instructs a terminal to perform the first access operation on a physical USB device, perform a first processing operation corresponding to the first access operation according to a compatibility policy, so as to feed back an execution result of the first processing operation to the server. The compatibility policy records a correspondence between the first access operation expected to be performed by the server on the physical USB device and the first processing operation performed by the terminal in response to the first access operation, and the first processing operation is an action performed by the terminal in response to the first access operation when the physical USB device does not support the first access operation.

Optionally, the processing module is configured to, if the physical USB device supports implementation of a second access operation that has a same function as the first access operation and that is different from the first access operation, the first processing operation includes a second access operation performed by the terminal on the physical USB device, and obtaining an execution result of the second access operation performed on the physical USB device; and if the physical USB device does not support implementation of another access operation that has a same function as the first access operation and that is different from the first access operation, the first processing operation includes the terminal directly obtains a response result of the first access operation.

Optionally, the compatibility policy is obtained by the server by matching according to device information of the physical USB device, and is delivered to the terminal.

Optionally, the processing module is further configured to, if the physical USB device supports implementation of another access operation that has a function different from a function of the first access operation, perform, on the physical USB device, another access operation indicated by the access request, and obtain an execution result of the another access operation performed on the physical USB device, so as to feed back the execution result of the another access operation to the server.

Optionally, a first processing policy is obtained and delivered to the terminal by the server according to the device information of the physical USB device when learning that the terminal accesses the physical USB device, where the first processing policy instructs the terminal to periodically read data from the physical USB device and cache the read data; and the processing module is further configured to execute, by the terminal, the first processing policy, so that when responding to a request of the server for expecting to read data from the physical USB device, the terminal directly feeds back cached data to the server.

Optionally, a second processing policy is obtained and delivered to the terminal by the server according to the device information of the physical USB device when learning that the terminal accesses the physical USB device, and the processing module is further configured to execute, by the terminal, the second processing policy, where the second processing policy instructs the terminal to compress data obtained by accessing the physical USB device, so as to feed back the compressed data to the server.

Optionally, the server provides a remote virtual desktop for user operation on the terminal using a virtual desktop system, and provides an access interface of the virtual USB device on the remote virtual desktop, so that a user operates the access interface to trigger the server to generate the access request.

According to the apparatus provided in this embodiment of the present application, after the access request sent by the server for the virtual USB device is received, if it is determined that the access operation indicated by the access request is the first access operation, the first processing operation corresponding to the first access operation is performed according to the stored compatibility policy. Because the action performed by the terminal in response to the first access operation when the physical USB device does not support the first access operation is set in the compatibility policy, even if the physical USB device is not designed according to the standard USB protocol specification, the physical USB device can still perform correct redirection according to the access request, improving a compatibility capability of USB redirection, and resolving a problem that some physical USB devices that are not designed according to a standard USB protocol specification cannot be redirected, so as to ensure that a user properly uses a physical USB device. In addition, in this embodiment of the present application, a processing policy that can improve work reliability and applicability is further set for the physical USB device, and the physical USB device can be controlled and activated using a compatibility policy, so that impact of a network condition (such as a delay or bandwidth) and the like on some USB devices may be reduced, ensuring a probability that the USB device can properly work.

Figure 13:
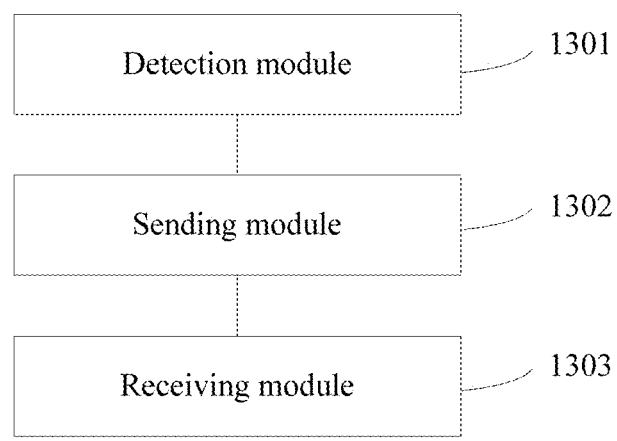
FIG. 13 is a block diagram of a USB device access apparatus according to an embodiment of the present application.

FIG. 13 is a schematic structural diagram of a USB device access apparatus according to an embodiment of the present application. Referring to FIG. 13, the apparatus includes a detection module 1301, a sending module 1302, and a receiving module 1303.

The detection module 1301 is connected to the sending module 1302, and is configured to, after a physical USB device accessed by a terminal is mapped into a virtual USB device using a virtual desktop system, detect whether an operation performed on the virtual USB device exists. The sending module 1302 is connected to the receiving module 1303, and is configured to, if the operation performed on the virtual USB device is detected, deliver an access request to the terminal. The terminal performs, after determining that the access request instructs to perform a first access operation on the physical USB device, a first processing operation corresponding to the first access operation according to a compatibility policy delivered by a server. The receiving module 1303 is configured to receive an execution result of the first processing operation fed back by the terminal. The compatibility policy records a correspondence between the first access operation expected to be performed by the server on the physical USB device and the first processing operation performed by the terminal in response to the first access operation, and the first processing operation is an action performed by the terminal in response to the first access operation when the physical USB device does not support the first access operation.

Optionally, the apparatus further includes an obtaining module configured to obtain a compatibility policy that matches device information of the physical USB device; and the sending module is further configured to deliver the compatibility policy to the terminal.

Optionally, the apparatus further includes an obtaining module configured to obtain the first access operation that is not supported by the physical USB device, the first processing operation that is set for the first access operation, and the device information of the physical USB device; and a storage module configured to record a correspondence among the first access operation, the first processing operation, and the device information of the physical USB device into the compatibility policy.

Optionally, the apparatus further includes a setting module configured to set a first processing policy for the physical USB device, where the first processing policy is used to instruct the terminal to periodically read data from the physical USB device and cache the read data; the storage module is further configured to store a correspondence between the first processing policy and device information of the physical USB device; the sending module is further configured to, when it is learned that the terminal accesses the physical USB device, obtain and deliver the first processing policy to the terminal according to the device information of the physical USB device, so that the terminal executes the first processing policy; and the receiving module is further configured to receive cached data that is fed back by the terminal when the terminal responds to a request of the server for expecting to read data from the physical USB device.

Optionally, the setting module is further configured to set a second processing policy for the physical USB device, where the second processing policy is used to instruct the terminal to compress data obtained by accessing the physical USB device; the storage module is further configured to store a correspondence between the second processing policy and device information of the physical USB device; the sending module is further configured to, when it is learned that the terminal accesses the physical USB device, obtain and deliver the second processing policy to the terminal according to the device information of the physical USB device, so that the terminal executes the second processing policy; and the receiving module is further configured to receive the compressed data fed back by the terminal.

After receiving the device information of the physical USB device accessed by the terminal and determining that the redirection function is successfully enabled for the physical USB device, the apparatus provided in this embodiment of the present application creates the virtual USB device corresponding to the physical USB device. Then, the apparatus sends the access request for the virtual USB device to the terminal. After determining that the access operation indicated by the access request is the first access operation, the terminal performs the first processing operation corresponding to the first access operation according to the stored compatibility policy. Because the action performed by the terminal in response to the first access operation when the physical USB device does not support the first access operation is set in the compatibility policy, even if the physical USB device is not designed according to the standard USB protocol specification, the physical USB device can still perform correct redirection according to the access request, improving a compatibility capability of USB redirection, and resolving a problem that some physical USB devices that are not designed according to a standard USB protocol specification cannot be redirected, so as to ensure that a user properly uses a physical USB device. In addition, in this embodiment of the present application, a processing policy that can improve work reliability and applicability is further set for the physical USB device, and the physical USB device can be controlled and activated using a compatibility policy, so that impact of a network condition (such as a delay or bandwidth) and the like on some USB devices may be reduced, ensuring a probability that the USB device can properly work.

It should be noted that, when the USB device access apparatus provided in the foregoing embodiment accesses the USB device, division of the foregoing function modules is used only as an example for description. In actual application, the foregoing functions may be allocated to different function modules for implementation according to a requirement. That is, an internal structure of the apparatus is divided into different function modules, so as to complete all or some of the functions described above. In addition, the fault tolerance processing apparatus provided in the foregoing embodiment and the fault tolerance processing method embodiments belong to a same concept. For a specific implementation process, refer to the method embodiments, and details are not described herein again.

An embodiment of the present application provides a terminal, including a USB client. The USB client includes a function required by a USB universal driver, and generally runs as an application program, and works in a user mode on a terminal side. That is, in this embodiment of the present application, the USB universal driver and the USB client are integrated, and run in a same process. Therefore, the terminal side needs only one integrated USB client.

The USB client is configured to receive an access request delivered by a server, where the access request is triggered by the server when detecting an operation performed on a virtual USB device; determine whether an access operation indicated by the access request is a first access operation; and if the access request instructs a terminal to perform the first access operation on a physical USB device, perform a first processing operation corresponding to the first access operation according to a compatibility policy, so as to feed back an execution result of the first processing operation to the server.

The compatibility policy records a correspondence between the first access operation expected to be performed by the server on the physical USB device and the first processing operation performed by the terminal in response to the first access operation, and the first processing operation is an action performed by the terminal in response to the first access operation when the physical USB device does not support the first access operation.

Optionally, if the physical USB device supports implementation of a second access operation that has a same function as the first access operation and that is different from the first access operation, the first processing operation includes a second access operation performed by the USB client on the physical USB device, and obtaining an execution result of the second access operation performed on the physical USB device.

If the physical USB device does not support implementation of another access operation that has a same function as the first access operation and that is different from the first access operation, the first processing operation includes the USB client directly obtains a response result of the first access operation.

Optionally, the compatibility policy is obtained by the server by matching according to device information of the physical USB device, and is delivered to the terminal.

Optionally, if the physical USB device supports implementation of another access operation that has a function different from a function of the first access operation, the USB client performs, on the physical USB device, another access operation indicated by the access request, and obtains an execution result of the another access operation performed on the physical USB device, so as to feed back the execution result of the another access operation to the server.

Optionally, a first processing policy is obtained and delivered to the terminal by the server according to the device information of the physical USB device when learning that the terminal accesses the physical USB device, where the first processing policy instructs the USB client to periodically read data from the physical USB device and cache the read data.

The USB client is configured to execute the first processing policy, so that when responding to a request of the server for expecting to read data from the physical USB device, the terminal directly feeds back cached data to the server.

Optionally, a second processing policy is obtained and delivered to the terminal by the server according to the device information of the physical USB device when learning that the terminal accesses the physical USB device.

The USB client is configured to execute the second processing policy, where the second processing policy instructs the USB client to compress data obtained by accessing the physical USB device, so as to feed back the compressed data to the server.

Optionally, the server provides a remote virtual desktop for user operation on the terminal using a virtual desktop system, and provides an access interface of the virtual USB device on the remote virtual desktop, so that a user operates the access interface to trigger the server to generate the access request.

According to the terminal provided in this embodiment of the present application, after the access request sent by the server for the virtual USB device is received, if it is determined that the access operation indicated by the access request is the first access operation, the first processing operation corresponding to the first access operation is performed according to the stored compatibility policy. Because the action performed by the terminal in response to the first access operation when the physical USB device does not support the first access operation is set in the compatibility policy, even if the physical USB device is not designed according to the standard USB protocol specification, the physical USB device can still perform correct redirection according to the access request, improving a compatibility capability of USB redirection, and resolving a problem that some physical USB devices that are not designed according to a standard USB protocol specification cannot be redirected, so as to ensure that a user properly uses a physical USB device. In addition, in this embodiment of the present application, a processing policy that can improve work reliability and applicability is further set for the physical USB device, and the physical USB device can be controlled and activated using a compatibility policy, so that impact of a network condition (such as a delay or bandwidth) and the like on some USB devices may be reduced, ensuring a probability that the USB device can properly work.

An embodiment of the present application provides a server, including a USB server and a USB virtual bus driver.

The USB virtual bus driver is configured to, after a physical USB device accessed by a terminal is mapped into a virtual USB device using a virtual desktop system, detect whether an operation performed on the virtual USB device exists.

After the USB virtual bus driver detects the operation on the virtual USB device, the USB server is configured to read and deliver an access request to the terminal. After determining that the access request instructs to perform a first access operation on the physical USB device, the terminal performs a first processing operation corresponding to the first access operation according to a compatibility policy delivered by the server.

The USB server is configured to receive an execution result of the first processing operation fed back by the terminal.

The compatibility policy records a correspondence between the first access operation expected to be performed by the server on the physical USB device and the first processing operation performed by the terminal in response to the first access operation, and the first processing operation is an action performed by the terminal in response to the first access operation when the physical USB device does not support the first access operation.

Optionally, the USB server is configured to obtain a compatibility policy that matches device information of the physical USB device, and deliver the compatibility policy to the terminal.

Optionally, the USB server is configured to obtain the first access operation that is not supported by the physical USB device, the first processing operation that is set for the first access operation, and the device information of the physical USB device; and record a correspondence among the first access operation, the first processing operation, and the device information of the physical USB device into the compatibility policy.

Optionally, the USB server is configured to set a first processing policy for the physical USB device, where the first processing policy is used to instruct the terminal to periodically read data from the physical USB device and cache the read data; store a correspondence between the first processing policy and device information of the physical USB device; when it is learned that the terminal accesses the physical USB device, obtain and deliver the first processing policy to the terminal according to the device information of the physical USB device, so that the terminal executes the first processing policy; and receive cached data that is fed back by the terminal when the terminal responds to a request of the server for expecting to read data from the physical USB device.

Optionally, the USB server is configured to set a second processing policy for the physical USB device, where the second processing policy is used to instruct the terminal to compress data obtained by accessing the physical USB device; store a correspondence between the second processing policy and device information of the physical USB device; when it is learned that the terminal accesses the physical USB device, obtain and deliver the second processing policy to the terminal according to the device information of the physical USB device, so that the terminal executes the second processing policy; and receive the compressed data fed back by the terminal.

After receiving the device information of the physical USB device accessed by the terminal and determining that the redirection function is successfully enabled for the physical USB device, the server provided in this embodiment of the present application creates the virtual USB device corresponding to the physical USB device. Then, the server sends the access request for the virtual USB device to the terminal. After determining that the access operation indicated by the access request is the first access operation, the terminal performs the first processing operation corresponding to the first access operation according to the stored compatibility policy. Because the action performed by the terminal in response to the first access operation when the physical USB device does not support the first access operation is set in the compatibility policy, even if the physical USB device is not designed according to the standard USB protocol specification, the physical USB device can still perform correct redirection according to the access request, improving a compatibility capability of USB redirection, and resolving a problem that some physical USB devices that are not designed according to a standard USB protocol specification cannot be redirected, so as to ensure that a user properly uses a physical USB device. In addition, in this embodiment of the present application, a processing policy that can improve work reliability and applicability is further set for the physical USB device, and the physical USB device can be controlled and activated using a compatibility policy, so that impact of a network condition (such as a delay or bandwidth) and the like on some USB devices may be reduced, ensuring a probability that the USB device can properly work.

An embodiment of the present application provides a USB device access system, where the system includes a terminal and a server. The server runs a virtual desktop system. When the terminal accesses a physical USB device, the physical USB device is mapped into a virtual USB device using a virtual desktop system.

The terminal is the terminal shown in the foregoing terminal embodiment, and the server is the server shown in the foregoing server embodiment.

A person of ordinary skill in the art may understand that all or some of the steps of the foregoing embodiments may be implemented by hardware, or may be implemented by a program instructing related hardware. The program may be stored in a computer-readable storage medium. The foregoing storage medium may be a read-only memory, a magnetic disk, an optical disc, or the like.

The foregoing descriptions are merely example embodiments of the present application, and are not intended to limit the present application. Any modification, equivalent replacement, and improvement made without departing from the spirit and principle of the present application shall fall within the protection scope of the present application.

What is claimed is:

1. A Universal Serial Bus (USB) device access method implement by a terminal, the USB device access method comprising:

accessing a physical USB device of the terminal;

receiving, in response to the accessing, a first processing policy from a server according to device information of the physical USB device, wherein the first processing policy instructs the terminal to periodically read data from the physical USB device and cache the data;

receiving an access request from the server in response to detection of an operation performed on a virtual USB device of the server, wherein the access request instructs performance of a first access operation on the physical USB device; and performing a first processing operation corresponding to the first access operation according to a compatibility policy when the physical USB device does not support the first access operation, wherein the compatibility policy records a correspondence between the first access operation and the first processing operation.

2. The USB device access method of claim 1, wherein performing the first processing operation further comprises:

performing a second access operation on the physical USB device and obtaining an execution result of the second access operation when the physical USB device supports implementation of the second access operation and when the second access operation has a same function as the first access operation; and obtaining a response result of the first access operation when the physical USB device does not support implementation of the second access operation.

3. The method of claim 1, wherein the compatibility policy is based on matching according to device information of the physical USB device, and wherein the method further comprises receiving the compatibility policy from the server.

4. The USB device access method of claim 1, further comprising:

performing, on the physical USB device, a second access operation indicated by the access request when the physical USB device supports implementation of the second access operation and when the second access operation has a function different from the first access operation; and obtaining an execution result of the second access operation in order to feed back the execution result to the server.

5. The USB access method of claim 1, the method further comprising feeding back the data to the server.

6. The USB device access method of claim 1, further comprising:

receiving a second processing policy from the server according to device information of the physical USB device when the terminal accesses the physical USB device, wherein the second processing policy instructs the terminal to compress data obtained by accessing the physical USB device in order to feed back the data to the server; and executing the second processing policy.

7. The USB device access method of claim 1, further comprising further receiving the access request via an access interface of the virtual USB device on remote virtual desktop.

8. A universal serial bus (USB) device access method implemented by a server, the USB device access method comprising:

sending, in response to detecting access of a physical USB device of a terminal, a first processing policy to the terminal according to device information of the physical USB device, wherein the first processing policy instructs the terminal to periodically read data from the physical USB device and cache the data;

detecting an operation performed on a virtual USB device of the server;

sending, in response to the detecting, an access request to the terminal, wherein the access request instructs performance of a first access operation on the physical USB device; and receiving an execution result of a first processing operation from the terminal, wherein the first processing operation corresponds to the first access operation based on a compatibility policy.

9. The USB device access method of claim 8, further comprising:

obtaining the compatibility policy, wherein the compatibility policy matches device information of the physical USB device; and delivering the compatibility policy to the terminal.

10. The USB device access method of claim 9, wherein before obtaining the compatibility policy, the USB device access method further comprises:

obtaining the first access operation that is not supported by the physical USB device, the first processing operation that is set for the first access operation, and the device information of the physical USB device; and recording a correspondence among the first access operation, the first processing operation, and the device information of the physical USB device into the compatibility policy.

11. The USB device access method of claim 8, further comprising:

setting a first processing policy for the physical USB device, wherein the first processing policy instructs the terminal to periodically read data from the physical USB device and cache the data;

storing a correspondence between the first processing policy and device information of the physical USB device;

delivering the first processing policy to the terminal according to the device information of the physical USB device such that the terminal executes the first processing policy when the terminal accesses the physical USB device; and receiving cached data fed back by the terminal when the terminal responds to a request of the server for expecting to read data from the physical USB device.

12. The USB device access method of claim 8, further comprising:

setting a second processing policy for the physical USB device, the second processing policy instructing the terminal to compress data obtained by accessing the physical USB device;

storing a correspondence between the second processing policy and device information of the physical USB device;

delivering the second processing policy to the terminal according to the device information of the physical USB device when the terminal accesses the physical USB device such that the terminal executes the second processing policy; and receiving the data fed back by the terminal.

13. A terminal comprising:

a memory comprising instructions; and a processor coupled to the memory and configured to execute the instructions, which causes the processor to be configured to:

access a physical Universal Serial Bus (USB) device of the terminal;

receive, in response to the accessing, a first processing policy form a server according to device information of the physical USB device, wherein the first processing policy instructs the terminal to periodically read data for the physical USB device and cache the data;

receive an access request from the server in response to detection of an operation performed on a virtual USB device of the server, wherein the access request instructs performance of a first access operation on the physical USB device; and perform a first processing operation corresponding to the first access operation according to a compatibility policy when the physical USB device does not support the first access operation, and wherein the compatibility policy records a correspondence between the first access operation and the first processing operation.

14. The terminal of claim 13, wherein the processor being configured to perform the first processing operation comprises the processor being configured to:

perform a second access operation performed by the terminal on the physical USB device and obtaining an execution result of the second access operation when the physical USB device supports implementation of the second access operation and when the second access operation has a same function as the first access operation; and obtain a response result of the first access operation when the physical USB device does not support implementation of the second access operation.

15. The terminal of claim 13, wherein the compatibility policy is based on matching according to device information of the physical USB device, and wherein the instructions further cause the processor to be configured to receive the compatibility policy form the server.

16. The terminal of claim 13, wherein the instruction further cause the processor to be configured to:

perform, on the physical USB device, a second access operation indicated by the access request when the physical USB device supports implementation of the second access operation and when the second access operation has a function different from the first access operation; and obtain an execution result of the second access operation in order to feed back the execution result to the server.

17. The terminal of claim 13, wherein the instructions further cause the processor to be configured to feed back the data to the server.

18. The terminal of claim 13, wherein the instructions further cause the processor to be configured to:

receive a second processing policy from the server according to device information of the physical USB device when the terminal accesses the physical USB device, wherein the second processing instructs the terminal to compress data obtained by accessing the physical USB device in order to feed back the data to the server; and execute the second processing policy.

19. The terminal of claim 13, wherein the instructions further cause the processor to be configured receive the access request via an access interface of the virtual USB device on a remote virtual desktop.

20. A server running a virtual desktop system, the server comprising:

a memory comprising instructions; and
a processor coupled to the memory and configured to execute the instructions, which causes the processor to be configured to:
  send, in response to detecting access of a physical Universal Serial Bus (USB) device of a terminal, a first processing policy to the terminal according to device information of the physical USB device, wherein the first processing policy instructs the terminal to periodically read data from the physical USB device and cache the data;
  detect an operation performed on a virtual USB device of the server;
  send, in response to the detecting, an access request to the terminal, wherein the access request instructs performance of a first access operation on the physical USB device; and
  receive an execution result of a first processing operation from the terminal, wherein the first processing operation corresponds to the first access operation bases on a compatibility policy.

21. The server of claim 20, wherein the instructions further cause the processor to be configured to:
  obtain the compatibility policy, wherein the compatibility policy matches device information of the physical USB device; and
  deliver the compatibility policy to the terminal.

22. The server of claim 21, wherein the instructions further cause the processor to be configured to:
  obtain the first access operation that is not supported by the physical USB device, the first processing operation that is set for the first access operation, and the device information of the physical USB device; and
  record a correspondence among the first access operation, the first processing operation, and the device information of the physical USB device into the compatibility policy.

23. The server of claim 22, wherein the instructions further cause the processor to be configured to:
  set a second processing policy for the physical USB device, the second processing policy instructing the terminal to compress data obtained by accessing the physical USB device;
  store a correspondence between the second processing policy and device information of the physical USB device;
  deliver the second processing policy to the terminal according to the device information of the physical USB device such that the terminal executes the second processing policy when the terminal accesses the physical USB device; and
  receive the data fed back by the terminal.

24. The server of claim 20, wherein the instructions further cause the processor to be configured to:
  set a first processing policy for the physical USB device, the first processing policy is used to instruct the terminal to periodically read data from the physical USB device and cache the data;
  store a correspondence between the first processing policy and device information of the physical USB device;
  deliver the first processing policy to the terminal according to the device information of the physical USB device such that the terminal executes the first processing policy when the terminal accesses the physical USB device; and
  receive cached data that is fed back by the terminal when the terminal responds to a request of the server for expecting to read data from the physical USB device.

* * * * *

UNITED STATES PATENT AND TRADEMARK OFFICE
CERTIFICATE OF CORRECTION

PATENT NO. : 10,552,348 B2
APPLICATION NO. : 15/940384
DATED : February 4, 2020
INVENTOR(S) : Mingdeng Li Page 1 of 1

It is certified that error appears in the above-identified patent and that said Letters Patent is hereby corrected as shown below:

In the Claims

Claim 3, Column 34, Line 29: "method of claim 1" should read "USB device access method of claim 1"

Claim 5, Column 34, Line 45: "USB access method" should read "USB device access method"

Claim 18, Column 36, Line 57: "the second processing instructs" should read "the second processing policy instructs"

Claim 20, Column 37, Line 22: "bases on" should read "based on"

Signed and Sealed this
Twelfth Day of May, 2020

Andrei Iancu
*Director of the United States Patent and Trademark Office*